Figure 6:
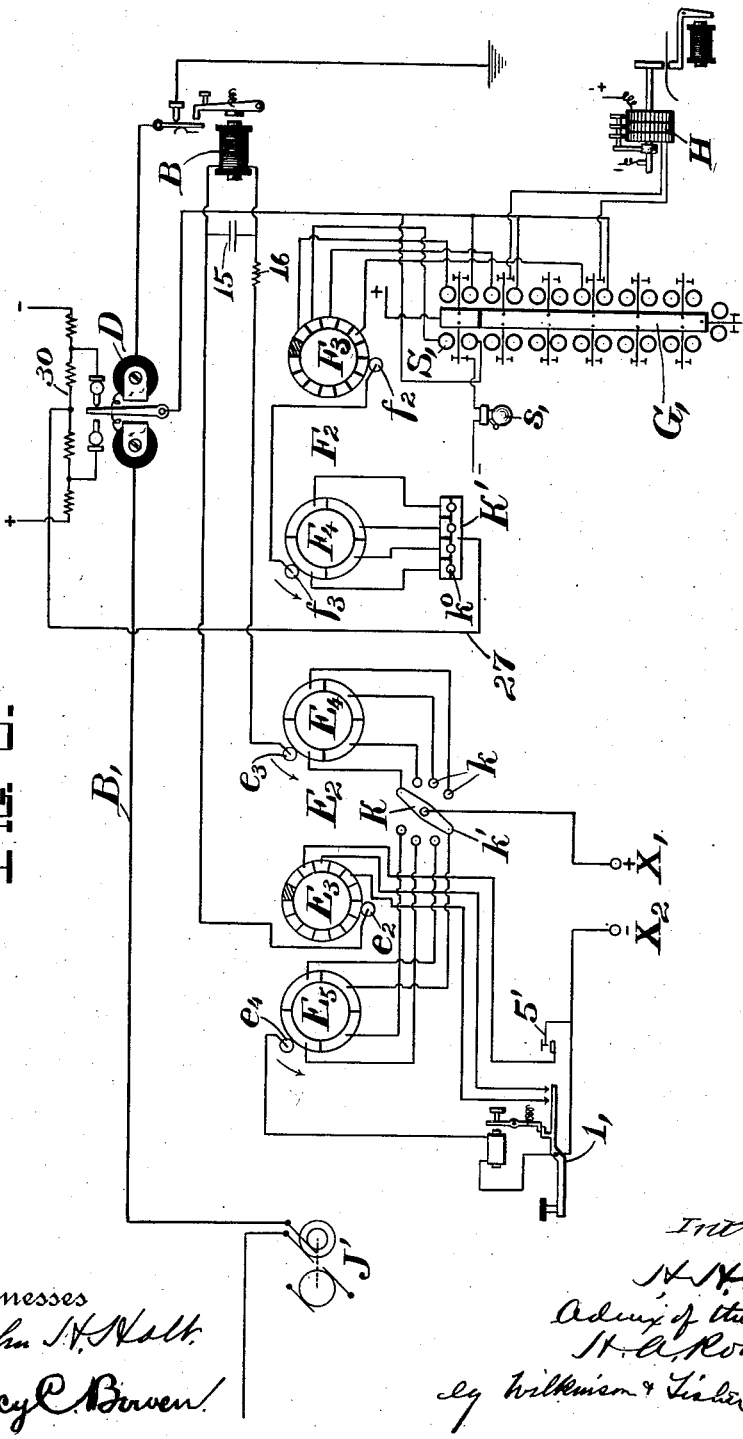

No. 704,928. Patented July 15, 1902.
H. A. ROWLAND, Dec'd.
H. H. ROWLAND, Administratrix.
TELEGRAPHIC DISTRIBUTION.
(Application filed July 24, 1901.)
(No Model.) 10 Sheets—Sheet 1.
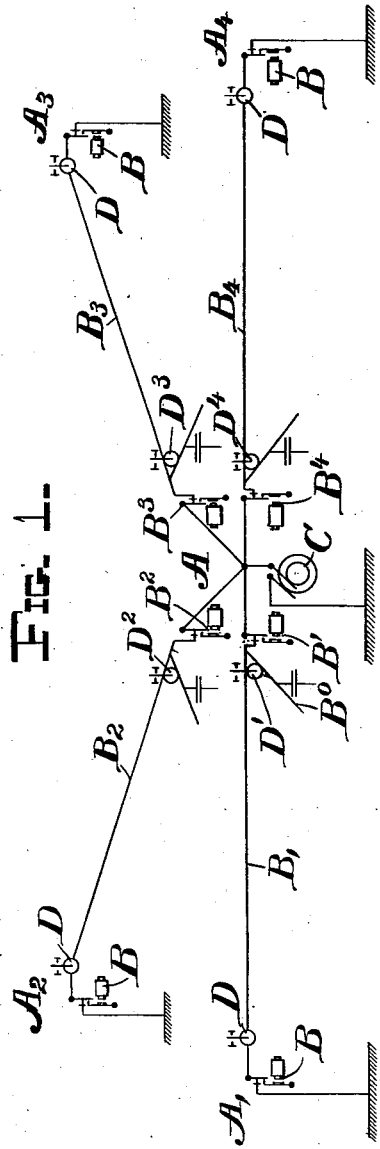
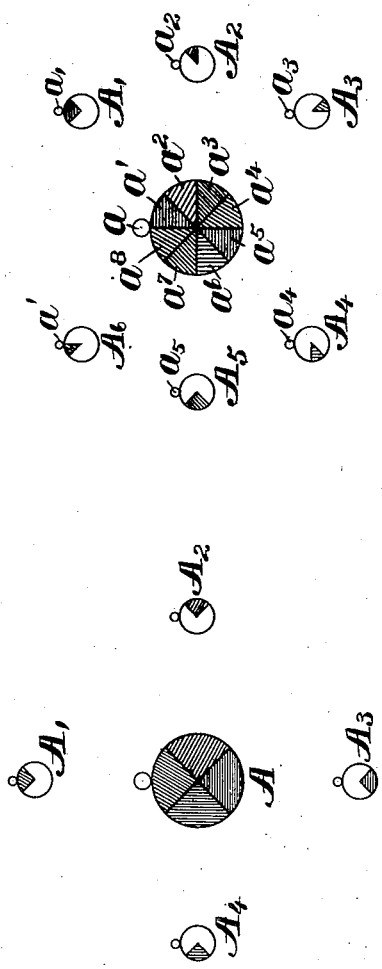
Witnesses
John N. Hall.
Percy C. Bowen.
Inventor
H. H. Rowland
admx. of the estate of
H. A. Rowland, deceased
by Wilkinson & Fisher
Attorneys

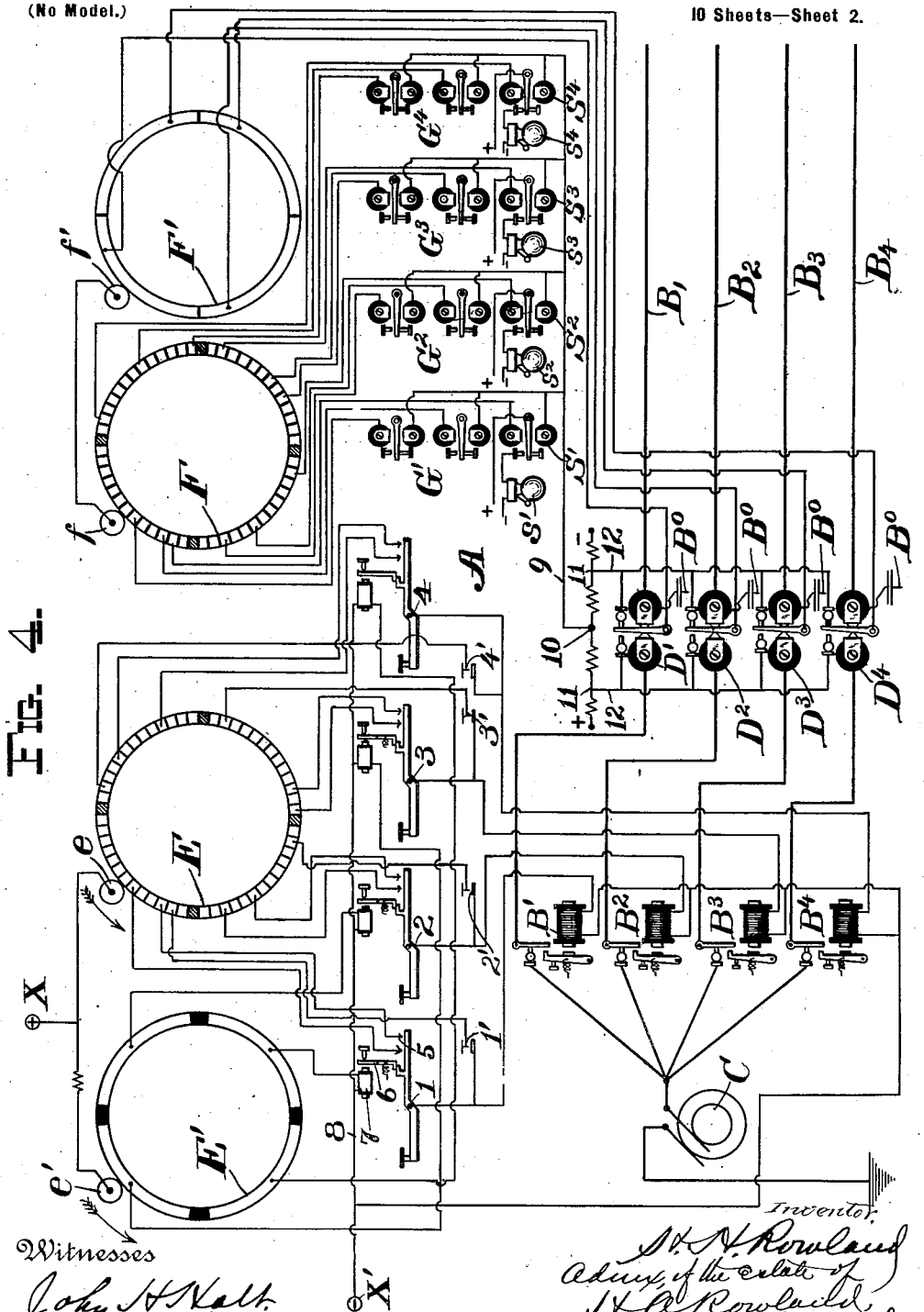

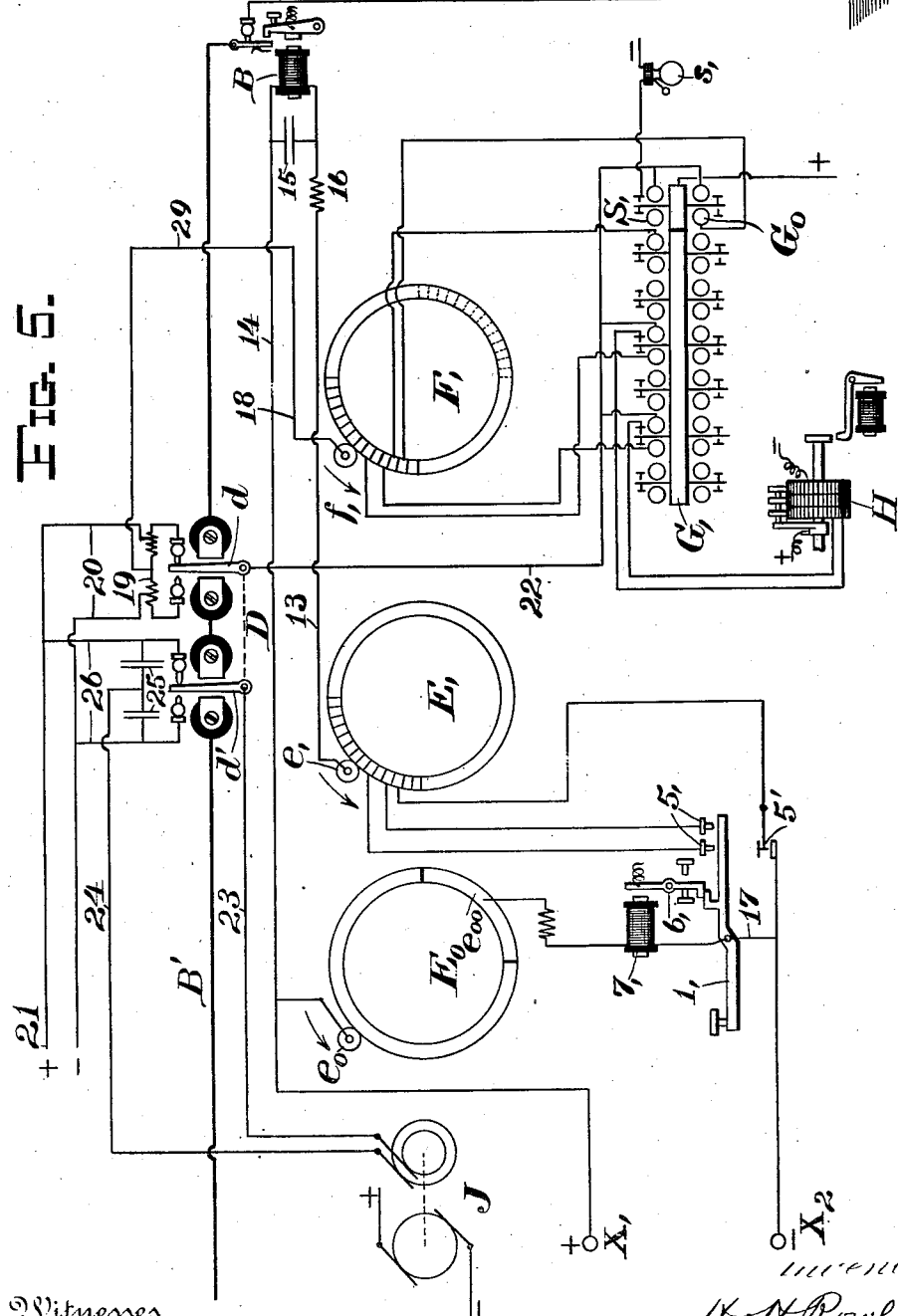

No. 704,928. Patented July 15, 1902.
H. A. ROWLAND, Dec'd.
H. H. ROWLAND, Administratrix.
TELEGRAPHIC DISTRIBUTION.
(Application filed July 24, 1901.)
(No Model.) 10 Sheets—Sheet 4.

Witnesses
Inventor
Attorneys

No. 704,928. Patented July 15, 1902.
H. A. ROWLAND, Dec'd.
H. H. ROWLAND, Administratrix.
TELEGRAPHIC DISTRIBUTION.
(Application filed July 24, 1901.)
(No Model.) 10 Sheets—Sheet 5.
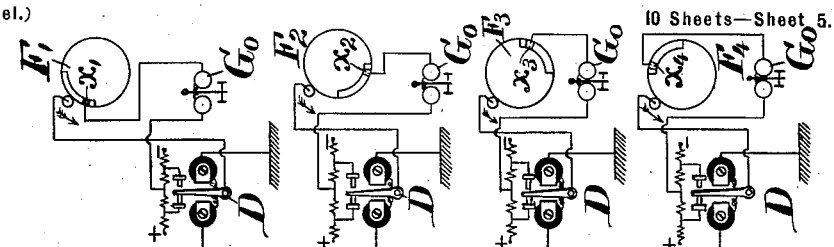
FIG. 7.
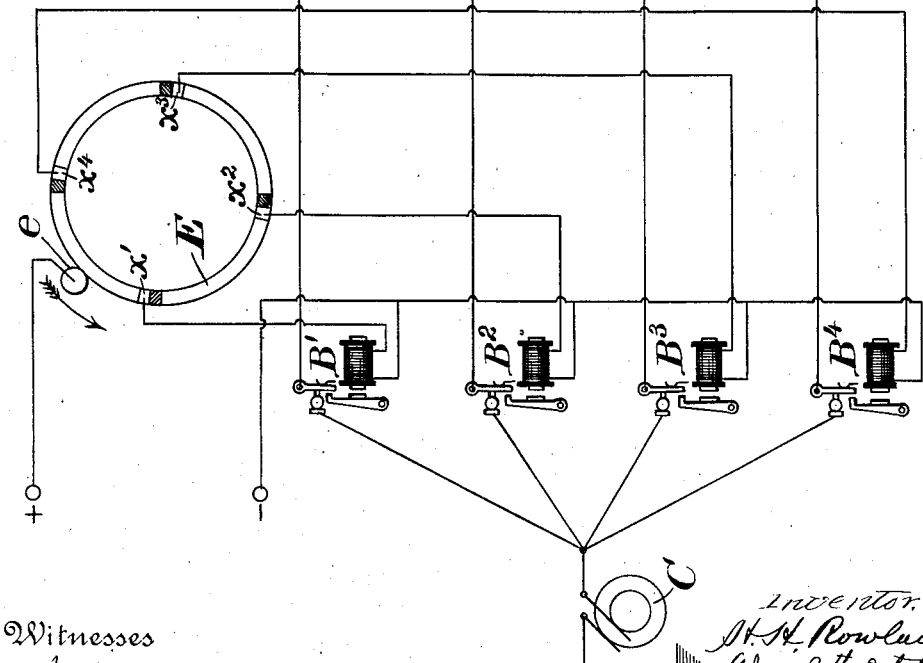

No. 704,928. Patented July 15, 1902.
H. A. ROWLAND, Dec'd.
H. H. ROWLAND, Administratrix.
TELEGRAPHIC DISTRIBUTION.
(Application filed July 24, 1901.)
(No Model.) 10 Sheets—Sheet 7.

Witnesses
John H Holt.
Percy C Bowen.

Inventor:
H. H. Rowland,
Admr. of the estate of
H. A. Rowland, deceased
by Wilkinson & Fisher
Attorneys No. 704,928. Patented July 15, 1902.
H. A. ROWLAND, Dec'd.
H. H. ROWLAND, Administratrix.
TELEGRAPHIC DISTRIBUTION.
(Application filed July 24, 1901.)

(No Model.) 10 Sheets—Sheet 8.

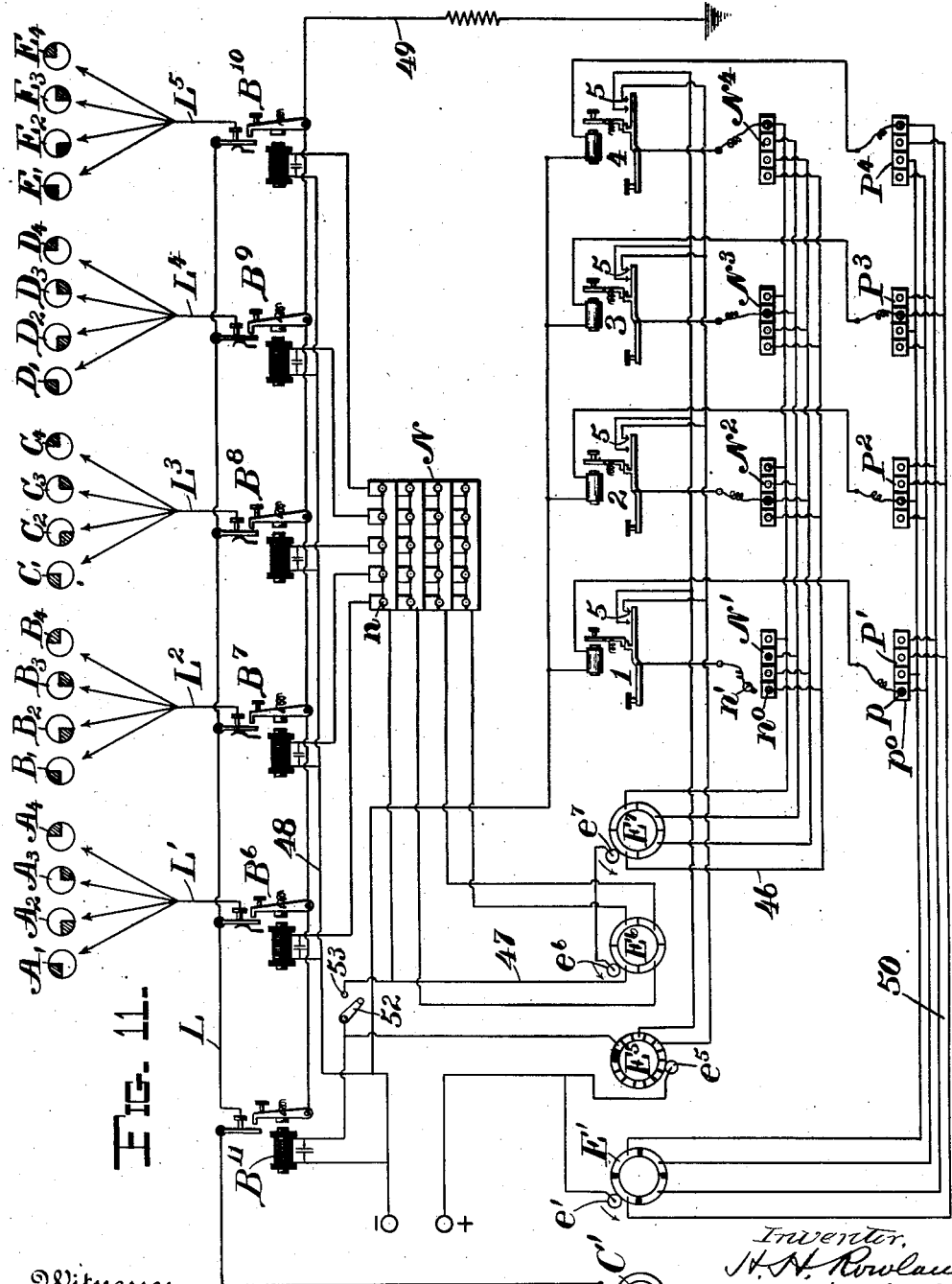

No. 704,928. Patented July 15, 1902.
H. A. ROWLAND, Dec'd.
H. H. ROWLAND, Administratrix.
TELEGRAPHIC DISTRIBUTION.
(Application filed July 24, 1901.)
(No Model.) 10 Sheets—Sheet 10.
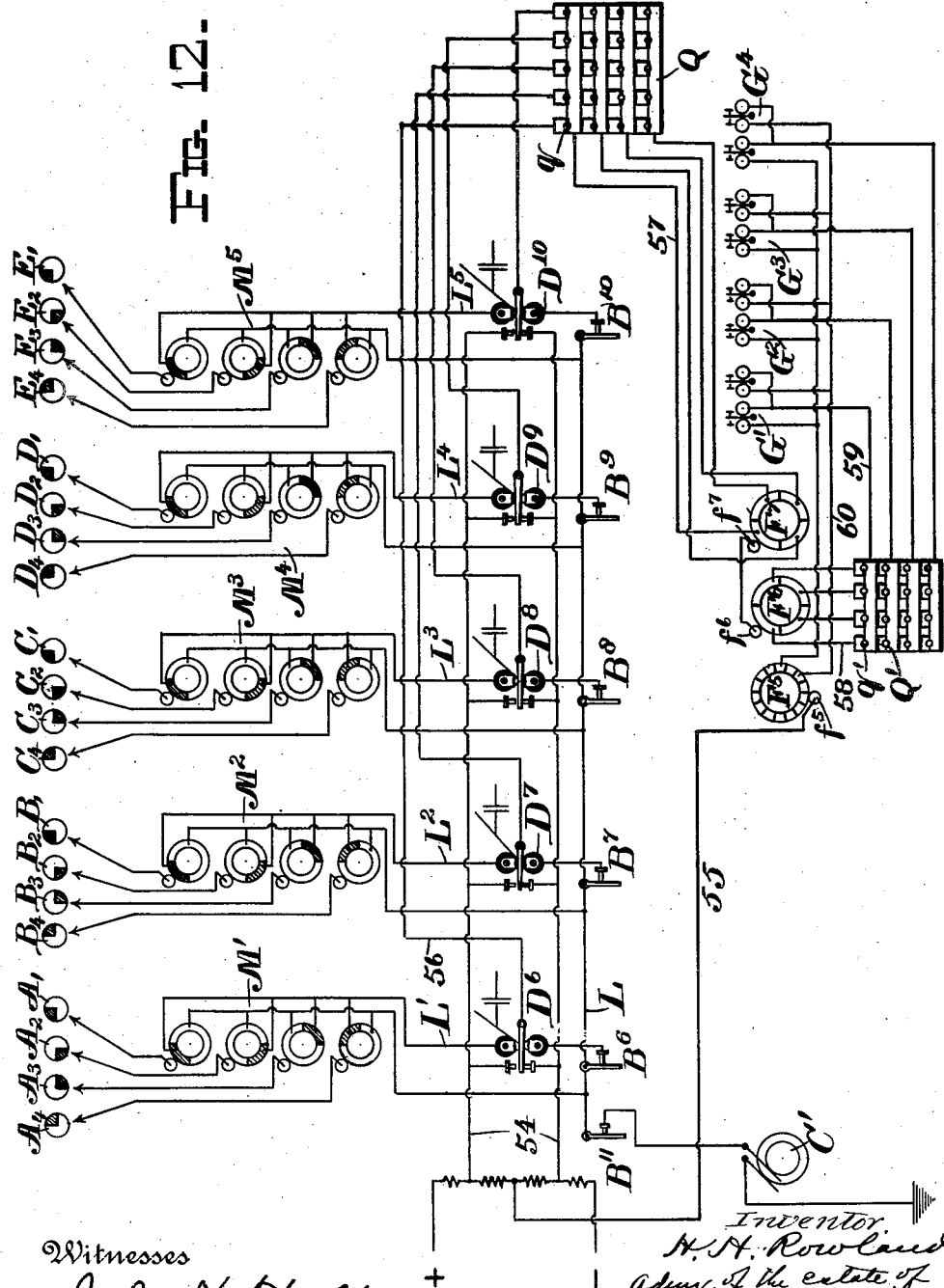

UNITED STATES PATENT OFFICE.

HENRIETTA H. ROWLAND, OF BALTIMORE, MARYLAND, ADMINISTRATRIX OF HENRY A. ROWLAND, DECEASED, ASSIGNOR TO ROWLAND TELEGRAPHIC COMPANY, OF BALTIMORE, MARYLAND, A CORPORATION OF NEW JERSEY.

TELEGRAPHIC DISTRIBUTION.

SPECIFICATION forming part of Letters Patent No. 704,928, dated July 15, 1902.

Application filed July 24, 1901. Serial No. 69,523. (No model.)

*To all whom it may concern:*

Be it known that HENRY A. ROWLAND, deceased, late a citizen of the United States, and a resident of Baltimore city, in the State of Maryland, did invent certain new and useful Improvements in Telegraphic Distribution, (Case I,) of which the following is a full, clear, and exact specification, such as will enable any one skilled in the art to manufacture and use the same.

This invention relates to improvements in systems of telegraphic distribution, and more particularly to such distribution as applied to central and substation intercommunication.

The present invention contemplates a system for the collection of messages at a central station from substations located in various parts of a large city or the collection of messages in a city from substations located in outlying districts or from points located at long distances and the transmission of messages from the central station to the substations. This distribution of the messages is effected by locating at central and at various substations current - distributing devices which bring the substations successively into communication with central at rapidly-recurring periods of time, the messages being impressed upon the line in any suitable or well-known way and their reception effected in any way that will properly interpret them, the present invention relating more especially to the distribution of the messages than to the specific manner in which they are impressed upon the line. Hence this system of distribution may be applicable to any of the well-known methods of telegraphic signaling.

According to this invention several operators at central may simultaneously transmit messages to all of the various substations and simultaneously receive messages from all of them, or several operators at central may send messages to several corresponding substations simultaneously and at the same time record at central the messages transmitted. This is also true with respect to the substations. Each can simultaneously transmit and receive messages or can alone transmit or receive, and the messages sent from any station may be recorded at that station as they are transmitted. Furthermore, one transmitting a message may also record the message transmitted at his own station on a separate receiving apparatus if such be provided for the purpose. Also, the various local transmitting and receiving instruments at central may be switched on or off from any of the substation-lines within limits hereinafter pointed out, and a single operator at central may transmit messages to all of the substations simultaneously. Furthermore, in any of the foregoing cases each substation may have its corresponding separate main-line transmitting and receiving apparatus located at central, or a single main-line transmitter and receiver may be used at central for a plurality of substations.

The present invention also contemplates the reduction of the line-wires to a minimum or the use of only one line from each substation to central; but it is not beyond the scope of this invention to multiply these lines if found advisable to do so. To this end, the lines between the central and substations may be simplex or simple lines, or if longer may be of the "reflected-wave" type, the term "reflected wave" being used to designate a line on which messages may be transmitted and received from both ends with a source of line-current located at only one end, and is used in cases where the distance is too great for this to be accomplished by the ordinary unbalanced or simple line, as will hereinafter be more particularly described. The lines may also be "duplexed," a term which will be herein used to designate a line in which two signals may be sent at absolutely the same instant in opposite directions. In any of the above cases the lines may be multiplexed. Moreover, the invention contemplates telegraphic intercommunication, in the manner above set forth, by means of alternating or other periodically-varying electric currents and is so designed that a single alternating-current dynamo or other source of alternating or other periodic currents located at the central station will be sufficient for all of the messages transmitted or received, however great may be the number of substations, though in case of duplex lines, if desired, small alternating-current dynamos or their equivalents may be located at the substations to effect the duplexing. Furthermore, the alternating or periodically-varying current may, by maintaining the synchronism of the distributing apparatus, be employed for effecting the distribution of messages transmitted by a current of any character. For the purpose of describing the present invention, however, it will be assumed that the messages are impressed upon a line, received, and printed in page or other form by means of synchronously-operated mechanism, substantially as shown and described in the United States Patent application of Henry A. Rowland for "Improvements in telegraphy," (Case G,) filed June 4, 1900, and serially numbered 19,070. Reference will be made also to the United States Patent applications of Henry A. Rowland for "Improvements in systems of telegraphic distribution," (Case J,) filed July 24, 1901, Serial No. 69,524, Patent No. 699,574, granted May 6, 1902; "Improvements in telegraphic page-printers," (Case K,) filed July 24, 1901, Serial No. 69,525, Patent No. 699,575, granted May 6, 1902; "Improvements in keyboards for telegraph-lines," (Case L,) filed July 24, 1901, Serial No. 69,526, and to other United States applications of Henry A. Rowland relating to improvements in telegraphy and which will be referred to more particularly hereinafter.

Special cases illustrating the principles of the present invention are shown in the accompanying drawings, in which—

Figure 8:
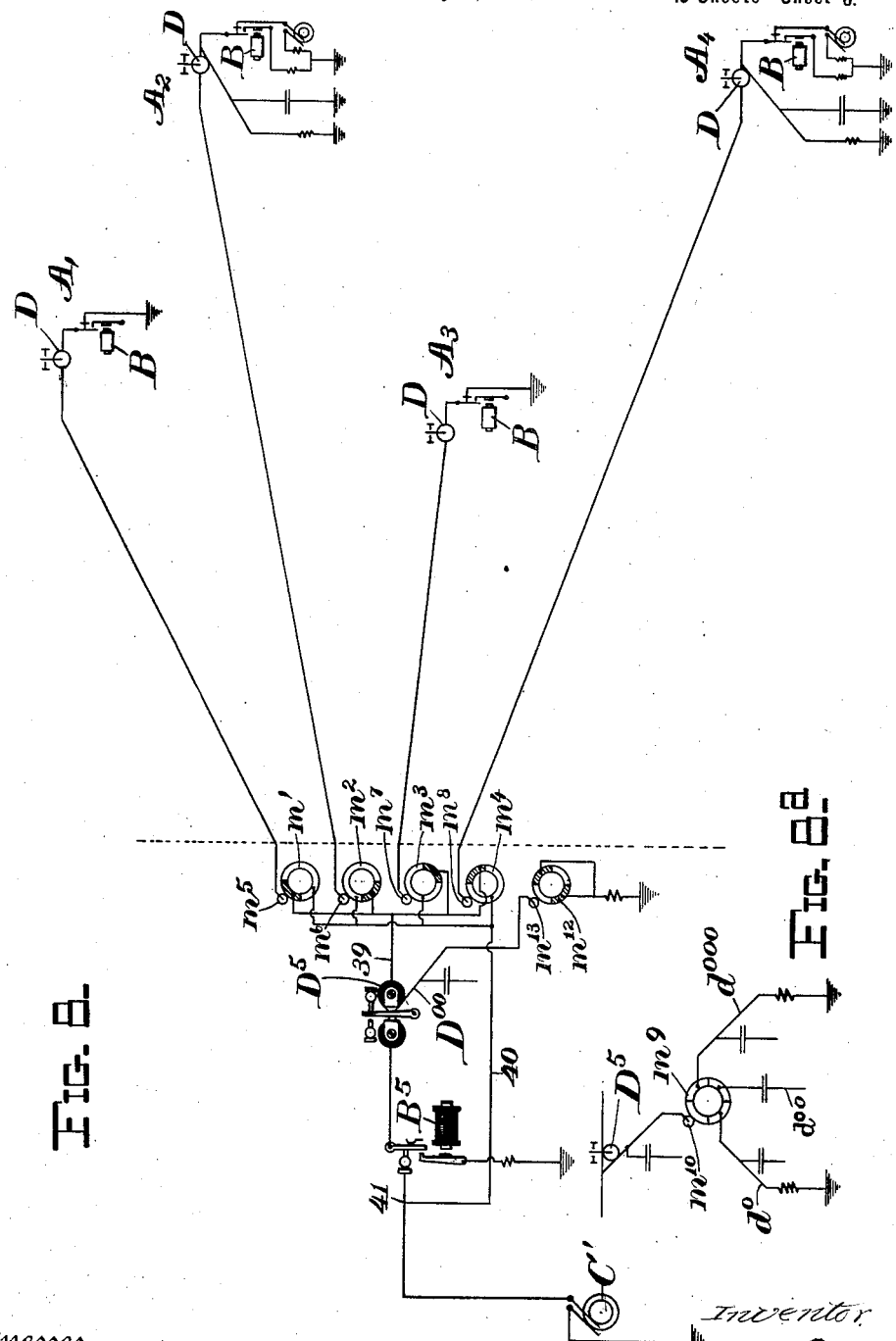
Figure 9:
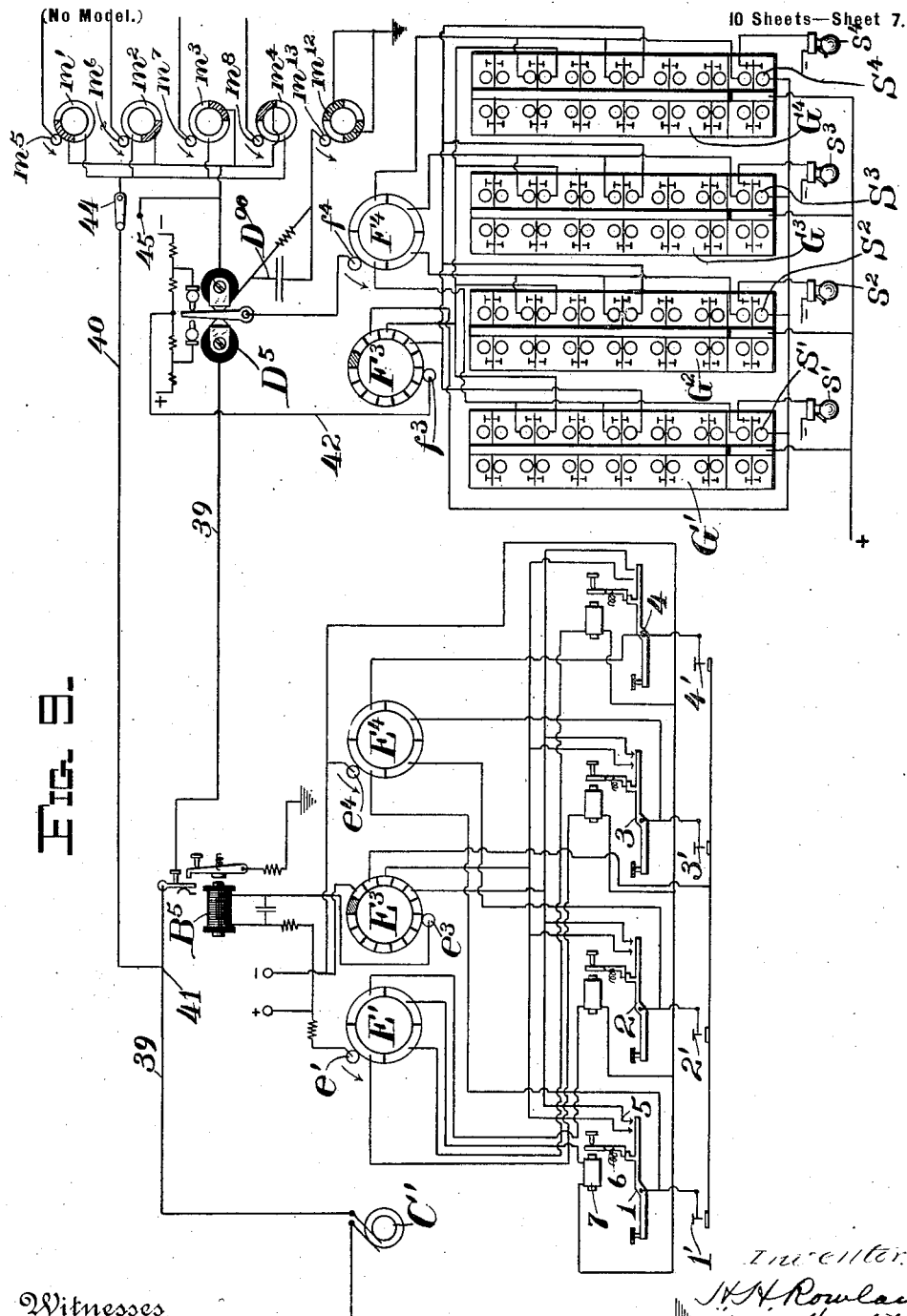
Figure 10:
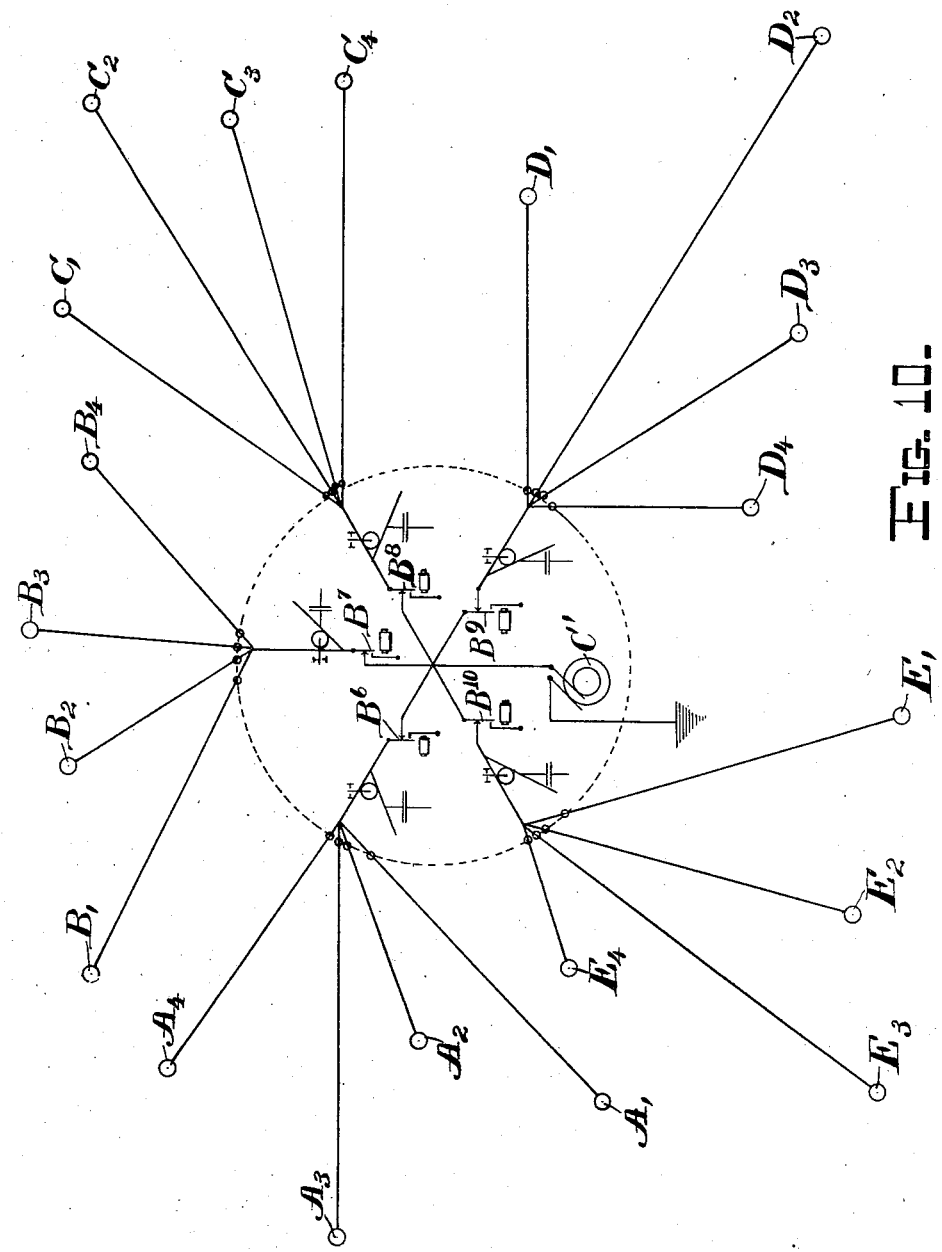

Figure 1 is a diagram representing one principle of intercommunication between the central station and four substations. Fig. 2 is a diagram illustrating the relation of the central distributing apparatus to that located at the substations. Fig. 3 is a diagram further representing the same, but in which all of the substations do not receive messages at the same rate or speed. Fig. 4 is a diagram representing the circuits and connections of one form of central receiving and distributing station adapted to receive and distribute messages from and to four substations. Fig. 5 is a diagram representing the circuits and apparatus located at a substation. Fig. 6 is a diagram representing the circuits and apparatus of a substation differing somewhat from that shown in Fig. 5. Fig. 7 is a diagram illustrating the principle of setting the sunflower-trailers. Fig. 8 is a diagram representing the principle of intercommunication between a central station and a plurality of substations in which a single main-line receiving-relay and transmitter is employed at central for all of the substations. Fig. 8$^a$ is a diagram showing one way of balancing the lines. Fig. 9 is a diagram representing the circuits and apparatus of a central station operating upon the principle shown in Fig. 8. Fig. 10 is a skeleton diagram showing a central station which may communicate with any number of substations. Fig. 11 is a diagram representing the circuits and connection of the transmitting apparatus of the central station indicated in Fig. 10. Fig. 12 is a diagram representing the circuits and connections of the receiving apparatus of the central station, also indicated in Fig. 10.

Similar letters and numerals refer to similar parts throughout the several views.

Reference will first be had to the case in which there is intercommunication between a central and four substations, four substations being selected for the sake of clearness in the description, as it will be shown hereinafter that these substations are not confined to that number. This case is illustrated in one form in Figs. 1, 2, 3, 4, 5, 6, and 7 and in another form in Figs. 8 and 9.

Referring first to Fig. 1, A represents the central station, and $A_1$, $A_2$, $A_3$, and $A_4$ four substations connected with the central by the lines $B_1$, $B_2$, $B_3$, and $B_4$, respectively. All of these lines are supplied with current of any periodically-varying character from a single source C at central, which source is preferably an alternating-current dynamo having one of its terminals connected to earth and the other to the branch lines and impressing upon these lines an electromotive force of sine wave or approximately sine-wave form, though it must be understood other forms of current may be used when desired. In addition to other parts each branch line is provided at central in this case with a main-line transmitter and a main-line receiving polarized relay, the transmitters being indicated by $B'$, $B^2$, $B^3$, and $B^4$ and the receiving-relays $D'$, $D^2$, $D^3$, and $D^4$, respectively. The lines at the substations are each provided with a transmitter B and a receiving polarized relay D. The receiving-relays at central are each provided with a differential winding, one coil of which is traversed by current which flows in the real line and the other by current which flows in an artificial line $B^0$, made up of sufficient self-induction, resistance, and capacity to enable it to balance the main-line charge reflected back to the dynamo when the main line is disconnected from ground. At the substations the receiving-relays have single windings, and the current of the real line normally passes directly through their coils and through the contact of the transmitter to earth. All of the main-line receiving-relays are herein shown as polar relays, though neutral relays may be substituted in such cases, as may be desired. For illustrating the principle of this invention it will be assumed that the function of these relays and transmitters is the same as described with reference to similar parts in the patent application Case G, above referred to—that is, the transmitters act to break or otherwise alter the main-line circuit for a predetermined length of time and to suppress or otherwise modify a definite number—two, for example—of the line-current impulses in a group of eleven or other number of impulses for each character or signal, and thus to bring the tongue of the relay adapted to receive the signal (normally kept vibrating by the periodic line-current) to rest, and in this manner causing the said relay to act upon apparatus which will record the signal thus transmitted. These transmitters may be of any desired form to properly effect the modification of the line-current, the invention not being limited to the specific form herein shown, which is the common form of circuit-breaking transmitter well known in the art. Also the line-relays may in some cases be neutral instead of polarized, as shown. Upon the installation of each line its central line-receiving relay is balanced by so adjusting the artificial line that when the real line is broken at the substation-transmitter contact, which disconnects the line from earth, this relay-tongue will be brought to rest and that upon closing the contact will commence to vibrate again. If the artificial line be not used, the capacity of the real line would in case the line were any other than a very short one prevent the operation of the substation-transmitter from having any useful effect upon the central relay. This adjustment once made does not require alteration on account of moderate changes in the insulation of the line due to weather variations, as it depends almost entirely upon the capacity and not upon the resistance of the line.

Any of the lines $B_1 B_2 B_3 B_4$ constitutes what is herein designated a "reflected-wave" line from the fact that a large proportion of the wave or impulse which enters the line at the dynamo end may be considered as reflected back from the distant end of the line when the electromotive force impressed upon the line changes sign. This reflected wave and its action will be more readily understood if we consider especially that the line is made up of distributed capacity, in which case the electricity sent out by the dynamo in one direction will charge the line, say, positively, and when the electromotive force of the dynamo falls to zero the line will then discharge and send a portion of its positive charge back to the dynamo, which will be the so-called "reflected wave." In respect to this reflected portion the artificial line balances the relay at the dynamo end of the line. This relay is kept normally vibrating by that portion of the real-line current which is not reflected back and which passes to earth by the transmitter-contact. If, therefore, this relay be balanced for the portion of the line charge reflected back, then opening the substation-transmitter contact will leave the central-station relay balanced, and its tongue will not vibrate.

*The central station.*—Referring to Fig. 4, which represents diagrammatically one form of the apparatus and connections of a central station—such, for example, as indicated in Fig. 1—E represents a transmitting-current distributer or sunflower, which, operating in conjunction with any suitable transmitting devices—such for example, as four keyboards 1 2 3 4—acts to distribute current from the local source to the transmitters $B' B^2 B^3 B^4$ at such times as to allow them to transmit messages to their respective substations. This transmitting-sunflower comprises in the case illustrated fifty-six metallic segments of equal width, over which is adapted to sweep a trailer $e$, which is driven in synchronism with the dynamo at such a speed that for each segment of the sunflower passed over by the said trailer a complete impulse will be generated by the dynamo, or, in other words, for each complete revolution of the trailer around the sunflower the dynamo will generate fifty-six complete impulses or semicycles. This trailer $e$ may be geared to the dynamo, driven directly by it, or driven in any other suitable way so long as it rotates in synchronism with it and is electrically connected in any suitable manner to the positive pole X of the local direct-current supply. The segments of this sunflower are divided in the case illustrated into four groups of fourteen segments in each group, the number of groups in this case corresponding to the number of substations. The segments in the upper left-hand quadrant of the sunflower will be designated the "first" group, and the other groups the "second," "third," and "fourth," respectively, counting anticlockwise. In each group the shaded or fourteenth segment is employed as the separating-segment between the groups and is generally idle, as contiguous segments of adjacent groups cannot always be used in the combinations necessary to transmit the messages, especially when suppressing the impulses, the reason for this being fully explained in the application Case G, above referred to. The first eleven segments preferably of each group are connected to eleven contacts of the four respective keyboards, the construction and operation of these keyboards being also fully described in the application Case G and in a more improved form in the application Case L, above referred to. Any suitable circuit making and breaking devices may, however, be substituted for these keyboards. Throughout the accompanying drawings the keyboards will be represented each by a single key, each of which is provided with two normally open contacts 5, which are permanently connected to two corresponding segments of each group of the sunflower E, and each key is permanently electrically connected to the positive terminal of its respective transmitter; key 1 to transmitter B', key 2 to transmitter $B^2$, and so on. Also, as described in each of the applications just referred to, each keyboard is provided with the locking-clapper 6 and clapper-magnet 7, the plus terminals of which latter are connected to separate segments, respectively, of the four-part clapper-distributer E', the trailer e' of which is connected to the positive pole X of the source of local direct current and sweeps around the distributer in the direction of the arrow in synchronism with the dynamo, being driven in any convenient manner. This distributer E' distributes current to the clapper-magnets successively in such order that the different keyboards may be operated at such times only as they will not interfere with the others, which will hereinafter more fully appear. The negative terminals of the clapper-magnet coils all connect to a common wire 8, which passes to the negative pole X' of the source of local direct current.

One or more segments each of the groups of transmitting-sunflower segments are connected to separate signaling push-buttons or equivalent devices 1', 2', 3', and 4', which operate the transmitters, which in turn suppress impulses on the line, thereby actuating signal-bells or other signaling apparatus at the substations. Also a segment of each group of the transmitting-sunflower segments is permanently connected to the positive wire leading to its respective transmitter, (see Fig. 7,) so that each time the trailer sweeps over one of them the transmitter corresponding to the group in which that segment is located will cut out or otherwise modify an impulse of the line-current. The object of this is to effect the proper setting of the trailers at the substations, which will be hereinafter more fully described. This thirteenth segment will be hereinafter designated the "letter-finder segment."

Also located at central is a receiving-current distributer or sunflower F, having the same number of segments as the transmitting-sunflower E and arranged in corresponding groups and order. This receiving-sunflower is provided also with a trailer $f$, which sweeps over its segments at a speed definitely related to that of the trailer of the sending-sunflowers at the substations and is driven by the dynamo or in any other suitable way. The first eleven segments preferably of each group of receiving-sunflower segments are connected to the positive terminals of the coils of a group or bank of printer selecting-relays $G'$, $G^2$, $G^3$, and $G^4$, only two segments of each group of eleven being shown connected to the selecting-relays in Fig. 4, as this is sufficient to illustrate the principle of the invention. These selecting-relays may record the messages in any suitable manner, as by operating type-printing machines, which they do in a manner fully set forth in the patent application Case G, above referred to, and which need not be at present described in detail, it being sufficient to say that for each signal received two selecting-relays of each group will be acted upon by having the current in the segment-circuits connected to them reversed as the trailer of the sunflower passes over the segments corresponding to the particular signal transmitted. The negative terminals of the coils of all of the relays of the four banks $G'$, $G^2$, $G^3$, and $G^4$ are connected to a common wire 9, connected to an intermediate point 10 of derivation of resistance connecting the poles of a constant-potential source of current of, for example, one hundred and ten volts. To two points of this resistance are connected the wires 12 12, across which are connected the tongue-contacts of the line receiving-relays $D'$, $D^2$, $D^3$, and $D^4$. The tongue of each of the main-line relays is electrically connected to a corresponding segment of the auxiliary current-distributer $F'$. This distributer has four segments corresponding to the four quadrants or groups of segments of the sunflower F and is provided with a trailer $f'$, which is permanently electrically connected to the trailer $f$ and is driven at the same speed as that trailer in any suitable manner. The object of the auxiliary current-distributing device $F'$ is to prevent short-circuiting between two or more of the tongues of the main-line relays, which would take place were these tongues not all entirely disconnected. It will thus be seen that the selecting-relays $G'$ receive all signals coming over line $B_1$; relays $G^2$, all signals coming over line $B_2$; relays $G^3$, all signals coming over line $B_3$, and relays $G^4$ all signals coming over line $B_4$.

The manner in which the main-line relays operate to cause the selecting-relays to operate the printing mechanism is fully set forth in the patent application Case G, hereinbefore referred to, and need not be herein minutely described, it being sufficient to say that as all the tongues of the main-line relays continue to vibrate between their contacts and as the trailer $f$ continues to rotate around the sunflower F local impulses will be transmitted through the coils of successive selecting-relays as the trailer passes from one segment to the next, transmitting to the coil of one relay a positive impulse, for example, to the coil of the next a negative impulse, and to the next a positive impulse, and so on throughout the series. The impulses thus distributed, however, will act to send the tongues of the selecting-relays against their back-stops; but when one of the main-line-relay tongues ceases to vibrate it will remain against the contact to which it was last attracted, and thus cause an impulse of opposite polarity to the normal impulse to traverse the coil of the relay connected to the segment of the sunflower which happens to be beneath the trailer at the time that the tongue of the said relay is against the said contact. This action upon two relays of each group is produced in the case illustrated by the transmission of each signal and prints a character or otherwise records a signal.

One or more segments of the groups of receiving-sunflower segments are connected to the coils of the relays $S'$, $S^2$, $S^3$, and $S^4$ in each bank of selecting-relays, which will be designated the "signal-relays." The tongue and forward contact of each of these signaling-relays is connected to one of a series of signal-bells S', S², S³, and S⁴ or other signaling device, respectively, by which predetermined signals may be received from the substations independently of the printing or other recording mechanism. Any other recording devices which will properly operate may be substituted for these selecting-relays.

*The substations.*—In Fig. 5 are diagrammatically represented in one form the circuits and apparatus located at the substations. It will be assumed that the diagram Fig. 5 represents substation $A_1$, where B represents a transmitter, and D a double-tongue main-line polar relay in which the tongues are electrically disconnected, but both are vibrated in unison by the line-current. There is located at this substation a transmitting-sunflower $E_1$, provided with a trailer $e_1$. This sunflower is provided with a group of segments, which correspond in angular position to similar segments upon the central-station receiving-sunflower. The trailer $e_1$ is electrically connected, as by wire 13, to one terminal of the coil of the main-line transmitter B, while the other terminal of this transmitter-coil is connected, as by wire 14, to the plus pole $X_1$ of the local direct-current supply. A small condenser 15, connected across the circuit 13 14 near the transmitter-coil, and a resistance 16 in the circuit between the trailer and the transmitter-coil, improves the action of the transmitter and reduces sparking at the trailer $E_1$. A similar condenser and resistance may be inserted in any of the other transmitter-circuits, if desired.

$1_1$ represents a key of a transmitting-keyboard; $5_1$, two normally open contacts, which are electrically connected to two segments of the transmitting-sunflower. $6_1$ represents the clapper, and $7_1$ the clapper-magnet. $E_0$ represents the clapper distributing-ring, provided with a trailer $e_0$, electrically connected to the positive pole of the local-circuit supply. The clapper-segment $e_{00}$ is electrically connected to the coil of the clapper-magnet, and this completes a circuit through its coils as the trailer $e_0$ sweeps over it, which actuates the clapper 6 and allows the key to be operated. For the rest of the time the key is locked. The construction and operation of this keyboard is the same exactly as those employed at central and simply represent one form of transmitting device operating in conjunction with the distributer, as any other form may be substituted when desired. The keys of the keyboard are permanently connected, as by wire 17, to the negative pole $X_2$ of the source of local direct current, as is also the negative terminal of the clapper-magnet coil $7_1$, while at central the keys of the various keyboards are all permanently connected to their respective transmitter-coils. The current, however, may be made to pass through these keyboards in any desired direction.

A push-button, key, or other equivalent device $5_1$ is connected to the twelfth segment of the sunflower E and operates the signal-bell $s'$ at central.

$F_1$ represents the substation receiving-sunflower, and $f_1$ its trailer. This sunflower is provided with a group of segments which normally occupy the quadrant of the sunflower corresponding in angular position to the segments upon the central-station transmitting-sunflower from which the substation receives messages.

The trailers $e_1$ and $f_1$ are driven in synchronism with their corresponding transmitting and receiving trailers at central station and occupy identical angular positions on the substation-sunflowers that the trailers $f$ and $e$ do on the central-station sunflowers, so that at the instant the transmitting-trailer at the substation arrives upon a particular segment the receiving-trailer at central will at the same instant arrive upon a corresponding segment. In practice, however, there would be a slight lag of one of these trailers relative to the other for a variety of reasons, which it is not necessary to explain. The segments of the substation-sunflowers are cut of such a width and the trailers driven at such a speed that, as in the case of the central-station sunflowers, the said trailers will pass over each segment for each impulse generated by the dynamo. In case the substation is at the end of a reflected main line the trailers $e$ and $f$ are both preferably in practice so mounted that their angular positions may be automatically adjusted in such a manner that if the trailers vary from the angular position corresponding exactly to those at the central station they will be brought back into the proper position, as hereinafter described. If these trailers are working upon a duplex line, the receiving-trailer only is adjusted relatively to the sending-trailer at the station from which it receives messages.

The trailer $f_1$ is electrically connected by a suitable contact to a wire 18, which connects to an intermediate point of the derivation of resistance 19, connected across the wires 20, leading from the source of constant-potential-current supply 21.

The first eleven segments of the receiving-sunflower are connected to the plus terminals of the coils of eleven relays, respectively, of a bank of selecting-relays $G_1$, while the negative terminals of the coils of these relays are all connected to a common wire 22, which connects to a tongue $d$ of the receiving-line relay.

H indicates a printer operated by the selecting-relays G, the construction and operation of the printer in its most approved form being fully described in the application, Case M, Serial No. 85,520, filed December 11, 1901. This printer in Figs. 5 and 6 may be replaced by any other suitable recording device. The twelfth segment of the sunflower $F_1$ is in this case connected to the positive terminal of the coil of the signal-relay $S_1$, which actuates a signal-bell $s_1$, while the thirteenth segment is connected to the "letter-finder" relay $G_0$.

All of the rotating parts at this substation (shown in Fig. 5)—that is to say, the sunflower-trailers, the rotating contacts, and printers, if used—are driven in synchronism with the dynamo at the central station, either directly or indirectly, by means of a synchronizer J—such, for example, as that shown and described in the patent applications, Cases G and M, above referred to, and comprising in one form a small direct-current motor having a set of synchronizing-coils traversed by an alternating current for regulating the speed of the motor. One terminal of the alternating-current coils of this synchronizer is connected, by means of a wire 23, to the tongue $d'$ of the main-line receiving-relay D, while the other terminal is connected by wire 24 to a point intermediate between two condensers 25, which are connected across the wires 26, leading from the contacts of the tongue $d'$ to the terminals of the source of direct-current supply 21. The alternate charging and discharging of the condensers as the tongue $d'$ vibrates by the line-current between its contact will send an alternating current through the wires 23 24 to the synchronizer, and thus keep it in step with the line-current, as fully described in Case G, referred to. This, however, is only one of many ways which may be employed for producing a local synchronizing current. The synchronizer may, when the line is short, be regulated by the main line passing directly through its coil, in which case the relay D may have only one tongue. The rotating parts at the substation may, however, be driven in synchronism in any desired manner, and generally when the substations are upon duplex lines these parts may be driven directly from the dynamo if the dynamo is operated in synchronism; if not, then the transmitting-sunflower trailer and its related parts only are driven by the dynamo. The tongue $d$ of the relay D is also kept vibrating in unison with the line-current through its coils and produces a relayed alternating current in the circuit 22 to 29, sending to the successive selecting-relays electrical impulses of alternate polarity as the receiving-trailer passes from one segment to the next. Changing this order of the impulses by the reception of a signal causes the relays to act and operate the recording mechanism as described relative to the central-station relays.

Operation: Before describing the operation of sending and receiving messages it will first be shown how the trailers at the substations are so adjusted that they occupy angular positions exactly corresponding to the trailers at central. This will be most clearly understood by referring to the diagram Fig. 7, where is represented on the left of the vertical dotted line only so much of the central-station apparatus as operates to set the substation-trailers, while at the substations $A_1$, $A_2$, $A_3$, and $A_4$ only such parts as are necessary to describe the operation of setting the trailers are shown. The segments $x'$, $x^2$, $x^3$, and $x^4$ at central represent the thirteenth segment of each group of transmitter-segments corresponding in angular position to their respective substation letter-finder segments $x\, x_2\, x_3\, x_4$. The central letter-finder segments are electrically connected to the coils of their respective transmitters, while the letter-finder segment at each substation is connected to one terminal of the coils of the letter-finder relay $G_0'$, the other terminal of the coils being connected to an intermediate point of derivation of resistances connected across the terminals of a source of constant-potential current. The substation-trailers each are connected to the tongue of its substation-line relay D. The central letter-finder segments $x'$, $x^2$, $x^3$, and $x^4$ cause the transmitters $B'$, $B^2$, $B^3$, and $B^4$, respectively, to suppress an impulse of their line-current once for each revolution of the central trailer, so that once in each revolution of the said trailer the substation-line-relay tongues will be brought to rest successively as the trailer at central passes over the letter-finder segments, and if the substation sunflowers and trailers are set properly, so that the instant the central trailer arrives upon a letter-finder segment the corresponding substation-trailer will arrive upon its letter-finder segment, then the letter-finder relay at that substation will receive current in such a manner as to operate it. If, however, the trailer at any substation is not properly set, the relay $G_0$ will either not receive current at all or not in the same direction that it would if the substation-trailer came upon the letter-finder segment at the instant the substation-line relay came to rest. Obviously, then, so long as the trailers and sunflowers are properly set the letter-finder relays $G_0$ will receive an impulse to carry them against their forward contacts once in each revolution of a trailer and remain inactive or receive impulses to carry their tongues against their back-stops when the trailers are not properly set, so that in this way it may be easily determined whether the proper setting has been effected or not, as the letter-finder relay may be made to indicate this in any desired way. For example, it may be made to effect the automatic setting of the trailer, as fully described in the patent application Case G, or it may be made to ring a bell or make a signal of any kind which will indicate the proper or improper setting of the trailers. In case the trailer of the receiving-sunflower at central is not driven by the dynamo or does not rotate in synchronism with the central dynamo it is also provided with a letter-finder relay which will act exactly in the same way as described relative to the substations.

The operation of sending and receiving messages between central and any of the substations is as follows: Let it be assumed, for example, that an operator at the first keyboard at central desires to send a message to substation $A_1$—that is, the substation shown in Fig. 5. In order to do this, he would operate, for example, the key 1. This cannot, however, be done until the clapper-trailer $e'$ arrives upon the third clapper-segment, which will allow the clapper 6 to operate and release the key. This will connect the said key to two segments of the first group of transmitting-sunflower segments, and this will complete the local circuit through the coil of the transmitter $B'$, connected to the key operated, twice, once as the trailer passes over the eighth segment and again as the trailer passes over the eleventh segment, causing the said transmitter to break the main-line current at its contact twice, each time for the length of time that the trailer is passing over the respective segments, and thus causing it to suppress or cut out two impulses of the current upon the line $B_1$. The effect of these suppressed impulses will be to cause the tongue $d$ of the receiving-relay D at substation $A_1$, Fig. 5, to come to rest twice, and this will occur as the trailer $f_1$ is passing over the segments of its sunflower corresponding to the segments at central station connected to the key operated. This will cause local impulses of opposite polarity to this normal impulse to pass through the coils of the selecting-relays connected to those segments which will send the tongues of these selecting-relays against their forward contact-stops and will thus complete circuits which will operate the printer H and cause it to print a character corresponding to the signal thus transmitted. The operation of these selecting-relays in causing the printer to print the signals thus transmitted forms no immediate part of the present invention, but is fully described in the patent application, Serial No. 19,070, Case G, hereinbefore referred to. Operators at the second, third, and fourth keyboard in the same manner send messages to their respective substations as the transmitting-sunflower trailer passes over the respective quadrants or groups of segments to which these respective keyboards are connected. Then if the operator at a substation, as indicated in Fig. 5, desires to transmit a message to central he operates his key $1_1$, which connects to his substation-transmitter two segment-circuits of the transmitting-sunflower, and thus causes the said transmitter to cut out impulses of the line-current corresponding to the segments so connected. This will cause the tongue of the main-line receiving-relay $D'$ at central to be brought to rest twice, and this cause the local selecting-relays $G'$ to act and record the message, as was described relative to the selecting-relays at the substation. In this way selecting-relays at central connected to the first group of receiving-sunflower segments record the messages transmitted from substation $A_1$, for example, the selecting-relays connected to the second group the messages transmitted from substation $A_2$, the relays connected to the third group of receiving-segments the messages from substation $A_3$, and the selecting-relays connected to the fourth group of receiving-segments the messages transmitted from substation $A_4$. Any of the operators at central may transmit to their respective substations signals independent of the regular printed messages—such, for example, as to indicate that a particular station is ready to receive or when one operator wishes to tell another to stop printing, &c. This is done by closing one of the push-buttons or keys $1'\ 4'$, which when operated completes the segment-circuit of the twelfth segment of the group of transmitting-segments corresponding to the push-button operated to the coil of the transmitter corresponding to the said push-button. This will cause the said transmitter to suppress an impulse of the line-current, which will bring the tongue of the main-line relay at the substation to which the signal is sent to rest at the moment the receiving-trailer at the substation arrives upon the receiving-segment there corresponding to the twelfth segment at central. This will cause the relay $S_1$ to send its tongue against its forward stop, which will complete a circuit from a local source of current through the magnet-coil of a signal-bell $s_1$ or an equivalent device. Each substation is provided with similar signaling-bells or other signaling devices, which are all operated from their respective push-buttons or equivalent devices at central in a manner similar to that just described. When the sunflowers are set so that the transmitting-segments at that station occupy the same angular position that the receiving-segments at that station occupy, then any message transmitted from that station will be recorded both at the station from which it is sent and at the station at the distant end of the line, unless the recording apparatus at the transmitting-station—the printer, for example—is disconnected. In case that the sunflower-segments are set in this manner and the lines are simple lines or reflected wave-lines a substation cannot both transmit messages and receive them at the same time, nor can central send and receive at the same time messages from all of the substations. If, however, the lines leading to the various substations are duplexed, then any substation can both transmit and receive messages at the same time, and in like manner the four keyboards or other transmitting devices and printers or other recording devices at central can send and receive messages simultaneously from all of the substations. This is done by balancing the substation line-receiving relays as well as the corresponding central line-receiving relays, so that the line-relay at any one station is neutral to all signals transmitted from that station and acted upon by all signals received at that station. A duplex substation is shown at $A_2$ and at $A_4$, Fig. 8, in which the duplexing may be effected in any suitable manner—as, for example, described in the patent application Case G and in the application Case J hereinbefore referred to. In any of the central stations herein shown if the line leading to the substations are duplex lines the receiving-trailer at central need not necessarily run in synchronism with the central transmitting-trailer, in which case the receiving-trailer would be driven by a synchronizer just as in the case of a substation when the central synchronizer would operate in synchronism with the substation-dynamo. There are, however, ways of getting rid of the substation-dynamo on duplex line, but which need not be described here. If, however, it is desired to send and receive messages at the same time at a substation or at central over one line without balancing the relay at both ends of the line, or, in other words, without duplexing the line in the strict sense of the term, this may be done by shifting one of the sunflowers, either the transmitting or receiving sunflower, until the segments of one sunflower are diametrically opposite to or one hundred and eighty degrees from the other segments at that substation, as shown by the dotted segments in Fig. 5, and at central until the group of transmitting-segments is one hundred and eighty degrees from the group of receiving-segments operating upon the same line. In this manner as the transmitting and receiving segments at any one station operating over the same line are located one hundred and eighty degrees apart and as the trailers travel together it is impossible for any confusion to occur, and this allows a printer to operate for a quarter of a revolution and the keyboard for another quarter of the revolution, alternately. This may be accomplished also by allowing the sending and receiving segments at any station to occupy the same angular positions and remain fixed while one of the trailers is shifted one hundred and eighty degrees relative to the other, as will be readily understood. In any case, however, the transmitting-segments at any station must correspond in angular position to the receiving-segments to which they transmit messages.

From the foregoing special cases, as well as others that follow, it will be seen that the distribution is effected by locating at central current-distributing devices, which bring the substations into communication with central successively at rapidly-recurring periods of time, and locating at the substations distributing devices which will allow the local substation apparatus to be operative only at such recurring periods. It will also be seen that as each segment of the central distributing device corresponds to an impulse generated by the dynamo, and as these segments are divided into groups, each of which corresponds to a substation, we may consider the successive impulses generated by the dynamo as divided up into corresponding groups, so that if the central distributers have, for example, fifty-six segments divided into four groups every fifty-six impulses generated by the dynamo may be considered as made up of four groups of impulses, in which case the first group of impulses would operate the apparatus to communicate with one substation—the first, for example—the second group the apparatus for the second substation, and so on. In the case where the number of groups of central distributer segments or impulses correspond to the number of substations each substation receives messages at the same rate —say forty words a minute—that is, if all of the trailers rotate at the same speed. If, however, the number of groups upon the central distributer are doubled, then the angular speed of the trailers will be one-half of their former speed, and may thus distribute messages to eight substations, but the rate at which they will receive messages will be half what it would be if there were only four, or twenty words a minute; but we may give some of the substations a twenty-words-per-minute service and others a forty-words-per-minute service, in which case the trailers at the forty-words-per-minute substations would rotate twice as fast as the central trailer. The difference between the ease in which all of the substations receive and send messages at the same rate or speed and the ease in which the substations send and receive messages at differing rates or speeds will be most clearly understood by referring to Figs. 2 and 3. Fig. 2 illustrates the ease in which all substations receive the same service—that is, they all transmit and receive messages at the rate, for example, of forty words a minute. In this case the four shaded quadrants A at central represent the times that central is in communication with the substations and the shaded quadrant at each of the substations $A'$ $A^2$ $A^3$ $A^4$ the time that the substations may communicate with central, each substation-quadrant corresponding in angular position, as will be seen, to a quadrant at central. Then if all of the trailers $a'$ to $a^4$ rotate at the same relative speed as the central trailer all substations will receive and transmit messages at the same speed and each during such times only as the shaded quadrants are beneath the trailer. The ease in which some substations receive and transmit messages at one speed and some at another is shown in Fig. 3. For illustrating this principle the central-station distributing-sunflowers are assumed to be divided into eight sections, represented diagrammatically by the circle A. Now if there were eight substations, each of which had a distributer or sunflower which would allow it to communicate with central only during the interval represented by one of the shaded sections of the ring A and all of the trailers rotated at one-half the angular speed as those shown in Fig. 2, the eight substations would all receive messages at, for example, the rate of twenty words a minute or half the speed as when there are only four substations. The reason for this is that doubling the number of segments of the central distributer diminishes the angular velocity of the trailers one-half, and this on account of the fact that however great the number of sections may be the trailer must pass over but one segment for each impulse of the periodic line-current. If, however, two diametrically opposite shaded segments of the ring A be devoted to one substation, this substation will receive signals twice in each revolution of the trailer A at central, whereas the others would receive messages only once in each revolution of each trailer. In the diagram Fig. 3 substations $A_1$ and $A_5$ are each given the use of two segments of the central distributer. Substation $A_1$ uses segments $a'$ and $a^5$, and substation $A_5$ uses segments $a^3$ and $a^7$, in which case both substations $A_1$ and $A_5$ would receive a forty-minute service; but to do this their trailers $a_1$ and $a_5$ must rotate twice as fast as the central trailer $a$. The substations $A_2$, $A_3$, $A_4$, and $A_6$ all have twenty-minute service, since the interval that each is active corresponds to a single segment of the ring A and their trailers all rotate at the same speed as the central trailer $a$.

In Fig. 6 is shown a substation provided with sunflowers $E_2$ and $F_2$, which will accomplish the same thing as shifting the segments of the single ring or one-part sunflower shown in Figs. 4 and 5 without adjusting the angular position of either sunflower or trailer. Each of these sunflowers is made up of two parts, $E_3$ and $E_4$ and $F_3$ and $F_4$, respectively. The parts $E_3$ and $F_3$ are divided into fourteen segments, and these segments are connected, respectively, to the keyboard $l_1$ and selecting-relays $G_1$ in the same manner that the segments of the groups upon the sunflowers described in Figs. 4 and 5 are connected, while the parts $E_4$ and $F_4$ are divided into four segments each. The trailers $e_2$ $e_3$ and $f_2$ $f_3$ all travel around the sunflower in the direction of the arrows in synchronism and are driven either directly or indirectly by the synchronizer $J'$, shown in this case directly connected to the main line, though it may be operated as shown in Fig. 5. The trailers $e_2$ and $f_2$ are, however, so geared or driven as to rotate at a speed four times as great as the trailers $e_3$ and $f_3$, so that for each quadrant passed over by the trailers $e_3$ and $f_3$ the trailers $e_2$ and $f_2$ will make a complete revolution of their sunflowers. Therefore the message transmitted from or received by this substation will depend, first, upon which quadrant of the ring $E_4$ is connected to the transmitter, and, second, upon which quadrant of the ring $F_4$ is connected to the tongue-contact of the main-line relay. The shifting of the segments of the ring $E_4$ is accomplished by the switch K, which is permanently connected to the positive pole of the local current-supply, while its contacts $k$ are connected to the segments of the ring $E_4$. The trailer $e_3$ is connected to one terminal of the transmitter-coil and the trailer $e_2$ to the other terminal of said coil and the four clapper-segments $E_5$ to the contacts $k'$ of the switch K. The segments of the receiving-sunflower ring $F_4$ are connected, preferably, to a four-plug switch $K'$, which is connected by the wire 27 to an intermediate point of derivation of resistances 30. The trailer $f_3$ is then electrically connected permanently to the trailer $f_2$. Therefore it will be seen that changing the switch K from one of the contacts $k$ to the other will have the same effect as shifting a fifty-six-segment sunflower—such as shown in Fig. 4, for example—from one quadrant to the next; or the changing of the switch K from the upper contact to the third contact or the contact connected to the third segment of the ring $E_4$ is the equivalent of adjusting the sunflower $E_1$, Fig. 5, until the segments of that sunflower are brought into the quadrant diametrically opposite to the one in which they are represented. The switch K is so arranged that at the same time it passes from one contact of a series $k$ it will also pass from one contact to the other of the series $k'$, so that the proper clapper-segments $E_5$ will always be connected to the keyboard. The same explanation applies to the receiving-sunflower and its group of selecting-relays, except that in this case there are no clapper-circuits to be provided for, and the switch for connecting into the main-line-relay circuits the various segments of the ring $F_4$ may, preferably, be a four-socket plug-switch. Thus the insertion of a plug in the first socket $k_0$ on the left would connect in the local relay-circuit the first quadrant of the ring $F_4$, and the insertion of a plug in the succeeding sockets, the second, third, and fourth quadrants of the said ring, respectively.

In the case just described and shown in the diagrams Figs. 1 and 4 each line leading into central from a substation was provided with a separate main-line transmitter and main-line receiving-relay. Each of the receiving-relays was independently balanced, and each acted to record the signals transmitted from its corresponding substation only. Messages may, however, be transmitted from the central to various substations and from substations to central by employing at central a single main-line relay and transmitter. In such a case the main-line receiving-relay is balanced for all of the lines leading to the substations. This case is represented in one form in the skeleton diagram Fig. 8, where $B^5$ represents the main-line transmitter, and $D^5$ the main-line receiving-relay at central and $C'$ the central dynamo. If all of the lines leading to the substations were connected directly to the wire 39, which traverses the coils of the main-line relay $D^5$, and the relay balanced with respect to all of these lines, breaking the circuit at any of the substation-transmitters would not be sufficient to bring the tongue of the relay $D^5$ to rest, for the current passing through its coils to the other substations would overbalance the effect produced by breaking the circuit at any one station—as, for example, by transmitting the signal. Hence unless the transmitters at the substations all act simultaneously the lines would be inoperative. This is overcome by locating at central a distributing device which will give each of the substation-transmitters the exclusive use of the central receiving-relay for preferably equal periods of time. M represents this distributing device, (shown in the diagram as made up of four conducting-rings $m'$, $m^2$, $m^3$, and $m^4$, each of these rings having a segment of conducting material, indicated by the shaded portion, insulated from the rest of the ring.) In ring $m'$ this segment occupies the first quadrant and in rings $m^2$, $m^3$, and $m^4$ the second, third, and fourth quadrants, respectively. All of these quadrants are electrically connected together and connected to a common wire 39, which traverses the coils of the main-line receiving-relay and contact of the transmitter. The metal portions of each of these rings, insulated from the shaded segment, are all connected to a common wire 40, which connects to the wire 39 at some point, as 41, between the transmitter-contact and the dynamo. The substations, however, always receive current from the dynamo at central in order to operate the synchronizer. This is effected by connecting all of the blank portions of the rings $m'$ to $m^4$ to a point in the dynamo-circuit between the dynamo and the transmitter $B^5$, as described. This distributing device is provided with four trailers $m^5$ to $m^8$, to which are respectively connected the lines which lead to the substations $A_1$, $A_2$, $A_3$, and $A_4$. These trailers are driven in synchronism with the dynamo in any suitable way, preferably by being mounted upon the same shaft with the central sunflower-trailers. By this arrangement the main-line transmitters at the substations are given the exclusive use of the central receiving-relay $D^5$ as their respective trailers pass over the successive shaded quadrants of the distributer. The central relay $D_5$ is differentially wound, one of its coils being traversed by the real line 39 and the other by the artificial line $D^{00}$ and is balanced in one way with respect to all of the lines as follows: All of the lines are disconnected from the relay except the longest, when the artificial line $D^{00}$ is adjusted until the tongue of the central relay comes to rest with the line disconnected from earth at the substation-transmitter and vibrates when the contact at that point is closed. The other lines are then built up by the addition of resistance and capacity until they equal the longest line, when they may be electrically connected to the line passing through the relay $D^5$, which will then be balanced for all lines. This adjustment may be made permanent and needs no correction for the weather. Another way of balancing the relay $B^5$ with respect to all of the lines is to have three artificial lines each, respectively, equal to the difference between the longest line and the line to which any of the other lines is to be added and successively switch these lines into connection with the permanent artificial line $D^{00}$ of the relay successively in such order as the said relay is operated by the transmitter at the substations. This method of balancing the lines is illustrated in Fig. 8ª, where $m^9$ represents a distributer, and $m^{10}$ its trailer, connected to the artificial line $D^{00}$, which will successively connect the artificial lines $d^0$, $d^{00}$, and $d^{000}$ to the permanent artificial line $D^{00}$ in the manner described. To make the case illustrated in Fig. 8 general, the two lines leading to substations $A_1$ and $A_3$ are shown as reflected wave lines, and those leading to stations $A_2$ and $A_4$ are duplexed—that is, the main-line relays at the substations, as well as the one at central, are balanced by an artificial line and operate only by signals from the distant end of the line, in which case there is ordinarily a dynamo at each of the duplex substations, which generate current to operate the relay at the distant end of the line. This dynamo, however, simply represents any source of alternating current, which may be derived from extra coils upon the printer driving-motor or may be derived from a source of direct current by any suitable current-changer adapted to convert a direct into an alternating or pulsating current. Inasmuch as the artificial line $D^{00}$ is ordinarily disconnected from earth in the case that the central receiving-relay is operated by the reflected wave-lines and is connected to earth in the cases in which it is operated by the duplex lines, it is necessary to provide some means by which this artificial line may at the proper time be connected and disconnected from earth. This is done by providing an auxiliary ring $m^{12}$, divided into four insulated segments, two of which are connected together and connected to earth, while the other two are disconnected from earth. This auxiliary ring is provided with a trailer $m^{13}$, which is connected with the artificial line $D^{00}$, so that when this trailer arrives upon disconnected segments of the ring the said artificial line will connect to earth, the segments connected to earth occupying positions corresponding to times when the receiving-line trailer is operated by the duplex lines, as shown. This device $m^{12}$ is simply an auxiliary affair and does not constitute an essential portion of the current-distributing apparatus and is only employed in the event of the lines being of such a mixed character. (Shown in Fig. 8.)

One form of central-station connections and apparatus for transmitting and receiving messages to and from four substations by using a single central transmitter and main relay for all stations is shown in Fig. 9. In this case each of the keyboards is given the exclusive use of the main-line transmitter for predetermined periods of time, determined by the transmitting current-distributer or sunflower. In the case shown in Fig. 9 this transmitting-sunflower is composed of two parts $E^3$ and $E^4$, provided with trailers $e^3$ and $e^4$, respectively. The part $E^3$ is divided into fourteen segments and the part $E^4$ into four segments. The first eleven segments of the part $E^3$ are connected each to eleven contacts of all of the keyboards, (only two of the segments being shown so connected in the diagram,) while the twelfth or signaling segment is connected to the four push-buttons or equivalent devices 1', 2', 3', and 4'. A return-wire from each keyboard is connected to a separate segment of the part $E^4$ of the sunflower. The trailer $e^3$ is electrically connected to one of the terminals of the coil of the transmitter, the other terminal of the said transmitter being connected to the positive pole of the local direct-current supply, while the trailer $e^4$ is permanently connected to the negative pole. The thirteenth or "letter-finder" segment is permanently connected to the local source of current and acts to modify an impulse of the line-current as the trailer $e^4$ passes over each of its four segments, and thus acts to set all of the substation-trailers, as described relative to Fig. 4. The receiving-sunflower in this case is also composed of two parts $F^3$ and $F^4$ and provided with trailers $f^3$ and $f^4$, respectively. The parts $F^3$ and $F^4$ contain the same number of segments as the parts $E^3$ and $E^4$ of the transmitter-sunflower. The sunflower-trailers are all driven in synchronism with the dynamo $C'$ in any convenient manner; but the trailers $e^3$ and $f^3$ are so geared that they rotate four times as fast as the trailers $e^4$ and $f^4$. The trailer $f^3$ is connected by wire 42 between two points of derivation of resistance connected across the terminals of the source of direct-current supply, while the trailer $f^4$ is electrically connected to the tongue of the main-line relay $D^5$. The first eleven segments of the part $F^3$ of the sunflower are connected to eleven corresponding selecting-relays in each of the banks $G'$ $G^2$ $G^3$ $G^4$, while all the negative terminals of the relay-coils of these banks of relays are connected to common return-wires, which connect to separate respective segments of the sunflower $F^4$. The twelfth segment of the sunflower is connected to the signaling-relays $S'$, $S^2$, $S^3$, and $S^4$. The clapper-distributer $E'$ is connected to the several keyboards and operates as hereinbefore described. It will thus be seen that the parts $E^3$ and $F^3$ determine the signals transmitted or received, while the parts $E^4$ and $F^4$ determine to which and from which of the substations these signals are sent and received, assuming that each of the keyboards or bank of selecting-relays sends and receives messages to and from separate substations. Let it now be required to send a message from any of the keyboards—say keyboard 1—to its corresponding substation, which will be substation $A_1$. Upon operating his key the operator connects to the said key two segments of the sunflower $E_3$, and when the trailer $e^3$ reaches these segments circuits will be completed through the transmitter-coil, passing as follows: first from the plus pole of the local current-supply, through the coil of the transmitter $B^5$, through the trailer $e^3$, through the segments nine and eleven successively as the trailer sweeps over them, through the wires connected to contacts 5 to the key, through the key into the wire connected to the first quadrant of the sunflower $E^4$, thence into the trailer $e^4$, and back to the negative pole, causing the transmitter $B^5$ to break the circuit at each time that the trailer $e^3$ passes over the segments connected to the key, while the trailer $e^4$ is upon the quadrant of the sunflower which corresponds to the particular keyboard operated. Then as the receiving-sunflower at the substation is adjusted so that its segments occupy positions angularly corresponding to the first segment of the sunflower $E^3$ $E^4$ the signal thus transmitted may be received by the substation receiving apparatus, as before described. This of course transmits only one character or symbol, the rest being transmitted by operating other keys of the keyboard, which will connect into the transmitter-circuit different combinations of transmitter-segments. In like manner signals or messages may be transmitted to the other stations successively from the second, third, and fourth keyboards as the trailer $e^4$ passes over the second, third, and fourth segments, respectively, of the sunflower $E^4$. The clapper-circuits of the keyboards are operated in this instance in exactly the same way as shown and described relative to the apparatus illustrated in Fig. 4. Let it next be required to receive a signal or message at central from any substation—such as, for example, the substation $A_3$. Assuming that the segments operated upon to transmit from the substation were, for example, the ninth and eleventh segments of the transmitting-sunflower, the tongue of the receiving-relay $D^5$ at central will be brought to rest at such times as the impulses of the line-current corresponding to these segments are suppressed, and when the trailer $f^4$ is upon the third segment of the sunflower $F^4$ at the same time that the trailer $f^3$ arrives upon the two segments nine and eleven of the sunflower $F^3$ the two selecting-relays having their coils connected to the segments nine and eleven and comprised in the group $G^3$, each having their return-wires connected to the third quadrant of the sunflower $F^4$, will receive the signal or message and actuate the printer or other recorder to which they are connected. In like manner signals or messages sent from any substations will be received upon the banks of the selecting-relays connected to other quadrants of the sunflower F⁴. In any event it is necessary for the trailers $e'$, $e^4$, and $f^4$ to occupy positions exactly corresponding to the trailers $m^5$ to $m^8$ on the distributer M. Let it next be required to send a message from one keyboard to all of the substations simultaneously. It will be assumed for the purpose of illustration that this message is to be sent from keyboard 2. All of the substations are then notified to set their receiving apparatus in position 2, which means that the segments of the receiving-sunflower of all of the substations must occupy the second quadrant, if the sunflower is constructed as shown in Fig. 5, or that a plug be inserted to connect to the receiving-relay the second quadrant of the sunflower F, if the sunflower is constructed as shown in Fig. 6. The switch 44 is then shifted to contact 45, which gives the receiving-relays at all of the substations the use of the central transmitter $B^5$. Then by operating the keys of keyboard 2 the same message will be received at each substation, as all of their receiving-sunflowers occupy corresponding angular positions. In like manner the substation-sunflowers may be capable of adjustment to any other quadrant. When operating the system in this way, it will be well to have some preselected quadrant as the one always used when messages are transmitted to all substations simultaneously, as this will simplify the adjustment of the trailers.

Fig. 10 is a skeleton diagram representing the case in which a central station with a small number of main-line transmitters and main-line receiving-relays—five, for example—may transmit and receive messages to and from a large number of substations—twenty, for example—the substations, for the sake of clearness in the description, being arranged in groups of four, each group having a corresponding central transmitter and receiving-line relay located in separate branch currents, all of which are supplied with current from the central-station dynamo or other source $C'$. Six or even eight lines may, however, be operated from each central relay and transmitter, in which case the messages would be transmitted and received at a slower speed, as herein described. This case is an extension of that shown in the diagram Figs. 7 and 8 and consists of a novel arrangement of central-station apparatus and connections by which the various substations may be put into communication with various receiving and transmitting devices at the central station. The connections of the transmitting apparatus of the central station indicated in Fig. 10 are diagrammatically shown in Fig. 11, where $A_1 A_2 A_3 A_4$, $B_1 B_2 B_3 B_4$, $C_1 C_2 C_3 C_4$, $D_1 D_2 D_3 D_4$, and $E_1 E_2 E_3 E_4$ represent the various substations located at the ends of the lines which operate from the five central lines $L'$, $L^2$, $L^3$, $L^4$, and $L^5$, respectively, and $B^6$, $B^7$, $B^8$, $B^9$, and $B^{10}$ the main-line transmitters, each having its forward tongue-contact connected in its respective line, the tongues being all connected to the common wire L, leading to the dynamo $C'$. The hammers of all the transmitters may or may not be connected to a common wire 49. If the lines are reflected wave-lines, it is not necessary to make this connection, but if duplexed the connection is made. The transmitting current-distributer or sunflower is in this case divided into three parts, part $E^5$ consisting of fourteen segments connected to the contacts 5 of the keyboards and parts $E^6$ and $E^7$ consisting each of four segments, each segment comprising a quadrant of the sunflower. Leading from the distributer $E^7$ are four wires 46, one connected to each of the segments of the said distributer. Connected in parallel to these wires are four plug-switches $N'$, $N^2$, $N^3$, and $N^4$. From the segments of the distributer $E^6$ lead four wires 47, connected to the four horizontal bars of the plug-switchboard N. The vertical bars of this switchboard are connected each to the plus terminal of the coil of a corresponding transmitter, while the negative terminals of all of the transmitters are connected to a common wire 48, which leads to the negative pole of the local direct-current supply. The trailer $e^5$ of the sunflower $E^5$ is directly connected to the plus terminal of the source of direct-current supply, while the trailers of the sunflowers $E^6$ and $E^7$ are electrically connected together. The clapper-circuits 50 are provided with plug-switches $P'$, $P^2$, $P^3$, and $P^4$ for changing the clapper connections for the various substations. Let it now be required to send a message from any keyboard 1 to any substation—$A_1$, for example. To do this, a plug will be placed in the socket $n$ of the switchboard N, and the plug $n'$ connected in the socket $n^0$ of the plug-switch $N'$, while clapper-plug $p$ is inserted in socket $p^0$. This will complete two of the segment-circuits of the sunflower $E^5$ through the coil of the transmitter $B^6$, which circuits may be traced from the plus terminal of the direct-current supply as follows: from the plus pole to the trailer $E^5$, and then into that one of the segments of the sunflower connected to the keyboard operated upon which the trailer first arrives—viz., segment nine—from there into one of the contacts of the key 1 operated, and from this key through the wire connected to plug $n'$, and thence into wire 46, connected to the first quadrant of the sunflower $E^7$, which is assumed to be the quadrant corresponding in angular position to the receiving-segments at the substation. From this quadrant the current passes through the trailer $e^7$ into the trailer $e^6$, thence into the first quadrant of the distributer $E^6$, and from there into the wire 47, leading to the switchboard N, and as the plug is inserted in socket $n$ electrical connection will be made with the vertical bar of this switchboard, which is connected to the coil of the transmitter $B^6$. This will cause the said transmitter to break the circuit of the line $L'$, which will transmit a signal to sunflower $A_1$. The trailer $e^5$ then arrives upon segment eleven, a circuit will be completed again through the said transmitter-coil and will cause the transmitter again to suppress the current, while the trailers $e^6$ and $e^7$ are on their first quadrants, which will send another signal to the substation $A_1$, the two said signals being combined, as understood, to form a character or sign at said substation. Likewise the operator at keyboard 1 may operate any of the transmitters $B^7$, $B^8$, $B^9$, and $B^{10}$ by inserting plugs in any of the sockets along the various vertical bars of the switchboard N on the top horizontal row. Then in order to send messages to the various substations of any relay the operator at keyboard 1 would insert plug $n'$ in any of the corresponding sockets of the switch N', the switchboard N therefore determining which transmitter shall be used and the plug-switch N' to which of the substations operated by the respective transmitters the message may be sent, this plug-switch of course operating to do this in conjunction with the sunflowers $E^6$ and $E^7$, respectively. In like manner any other keyboard may transmit messages to any substation. All four keyboards may therefore transmit messages at the same time to any four separate substations so long as two are not at the same time trying to use the same quadrant of the ring $E^7$. In some cases it is desirable to transmit the same message to all substations simultaneously. Let it be required that this be done by the operator at keyboard 1. For this purpose the extra transmitter $B^{11}$ is inserted in the line L between the transmitter $B^6$ and the dynamo, so that when it operates to break the circuit through its contact this will suppress one or more impulses on all of the substation-lines, since it cuts off entirely the dynamo-current for all lines for each signal irrespective of the distributers M' and $M^5$. (Shown in Fig. 12.) The substations are all signaled to set their receiving-segments in the same predetermined angular position—viz., in quadrant one. This done, the switch 52 is shifted to the contact 53 and all plugs removed from switchboard N. This switch 52 placed thus connects the coil of the transmitter $B^{11}$ in circuit with the first quadrant of the sunflower $E^6$. The plug n of keyboard 1 is then inserted in socket $n^0$ and clapper-plug p in socket $p^0$. The operation of keyboard 1 will then operate transmitter $B^{11}$ only when the trailers $e^6$ and $e^7$ are passing over the first quadrants of their sunflowers, which correspond to the angular positions of the receiving-segments at all of the substations, so that in this way all of the substations receive the same message.

In Fig. 12 is diagrammatically shown the connections for the receiving apparatus at the central station, (shown in Fig. 10,) where $D^6$, $D^7$, $D^8$, $D^9$, and $D^{10}$ represent the main-line receiving-relays, each of which is located upon its respective line L', $L^2$, $L^3$, $L^4$, and $L^5$, leading from the dynamo C', and is connected to the current-distributing devices M', $M^2$, $M^3$, $M^4$, and $M^5$, which distribute current to the lines leading to the various substations, (indicated $A_1$ to $E_1$ respectively). The contacts of these main-line relays are connected in parallel between two wires 54, which lead from two points of derivation of resistance connected across the terminals of the local direct-current supply, and the tongues of these relays are connected by five wires to five insulated bars, respectively, of the switchboard Q. The horizontal bars of this switchboard are four in number and are connected, respectively, to the wires leading to the four segments of the sunflower $F^7$. The trailer $f^7$ of this sunflower is electrically connected to the trailer $f^6$ of the distributer $F^6$, having four segments connected, respectively, to the vertical bars of the switchboard Q', the horizontal bars of this switchboard each being connected, respectively, to wires which form the common return-wires from the negative terminals of the coils of the banks of selecting-relays G', $G^2$, $G^3$, and $G^4$, respectively. The positive terminals of the coils of these selecting-relays are connected to corresponding segments of the distributer $F^5$, which is provided with a trailer $f^5$, adapted to rotate at four times the speed of the trailers $f^6$ and $f^7$, and is connected to a wire 55, leading from a point intermediate between resistances connected across the terminals of the said source of direct-current supply. Let it be assumed that the operator at substation $A_1$, for example, desires to send a message to central. In order to receive this message, a plug would be inserted in socket q of the switchboard Q and a plug in the socket q' of the switchboard Q'. Assuming that this signal was sent by the suppression of the ninth and eleventh impulses, the tongue of the main-line relay $D^6$ would be brought twice to rest, as hereinbefore described, which will occur at such times as the trailer of the sunflower $F^5$ arrives upon the segments nine and eleven, respectively. This will complete circuits through the coils of the selecting-relays G' and cause them to record the signals. The circuits completed which operate these relays may be traced as follows: from the plus pole of the local current-supply to one of the wires 54, connected to it, thence into the contact of the main-line relay $D^6$, through the tongue of that relay into the wire 56, and thence into the bar of the switchboard Q to which that wire connects, through the plug q into the horizontal bar in which said plug is inserted, thence into the wire 57, into the segment of the sunflower $F^7$ to which said wire connects, through the trailer $f^7$, passing over said segment to the trailer $f^6$, and thence into the segment of the sunflower $F^6$ corresponding in angular position to the segment of the sunflower $F^7$ over which the trailer $f^7$ is at that time sweeping, into the wire 58, and thence into the vertical bar of the switchboard Q through the plug, and thence by wire 59 into the coils of the relay connected to the wire 60, which leads to segment nine of the sunflower F⁵, and as the trailer $f^5$ arrives upon its segment the circuit will be completed through said trailer back to the negative pole of the local current-supply through wire 55. Then as the trailer $f^5$ arrives upon the eleventh segment the circuit will be completed in a similar manner through the selecting-relay of the bank G', having its coil connected to the eleventh segment of the sunflower F⁵. In like manner any one of the banks of selecting-relays G' to G⁴ may be made to receive messages from any one of all of the substations by inserting the plugs in the proper sockets of the switchboards Q and Q', the vertical bars of the switchboards determining which bank of selecting-relays is to be used, which latter is also determined by the sunflowers F⁶ and F⁷. The function of the sunflower F⁷ is to keep the tongues of the various main-line relays separate, and thus prevent short-circuiting. Moreover, all four banks of selecting-relays may be simultaneously receiving messages, the limitation being that no two banks can be receiving at the same time upon the same quadrant of the sunflower F⁷. Obviously this case is not confined to the use of four banks of selecting-relays or recorders or printers, as each substation may have its corresponding printer or other recorder at central, in which case all substations can communicate with central at the same time, and this applies also to the keyboards of the transmitting apparatus. Also any desired system of signaling may be carried on between the central operator and substation operator independent of the regular messages. Furthermore, while it has been necessary to select special examples in describing the principles of this invention it is obvious that these special cases may be varied without departing from the spirit of the invention. Thus the invention is not confined to the specific number and arrangement of the distributer or sunflower segments illustrated or to the specific system of impressing the messages upon the line by cutting out for each character a different combination of two impulses in each group of eleven, as the impulses may be modified also by changing their character in many different ways, as by reversing their polarity or reducing or increasing their intensity, &c. Also the impulses may be modified in combinations for each character according to any code, Morse or other, without departing from the spirit of the invention. Indeed there are many changes which may be made without departing from the spirit of the invention, some of which have been hereinbefore pointed out.

The invention having thus been described, what is claimed, and desired to be secured by Letters Patent of the United States, is—

1. In the distribution of telegraphic messages, a central station and a plurality of substations, a source of periodic signaling-current located at the central station, telegraph-lines leading from said central station to said substations and supplied with current from the said source, main-line transmitting and receiving instruments located at the central station and at each of the substations, and means located at central and at each of the substations whereby the central and sub stations may be placed in communication with each other at rapidly-recurring periods, substantially as described.

2. In the distribution of telegraphic messages, a central station and a plurality of substations, an alternating-current dynamo located at the central station, telegraph-lines leading from said central station to said substations, and supplied with current from said dynamo, main-line receiving and transmitting instruments located at the central station and each of the substations, and means located at central and any of the substations whereby the central and sub stations may be placed in communication with each other at rapidly and regularly recurring periods of time, substantially as described.

3. In the distribution of telegraphic messages, a central station and a plurality of substations, a source of periodic signaling-current located at the central station, telegraph-lines leading from said central station to said substations and supplied with current from said source, main-line transmitting and receiving instruments located at central and at each of the substations, current-distributers located at central and at the substations whereby the central and sub stations may be placed in communication with each other at regularly and rapidly recurring periods, substantially as described.

4. In the distribution of telegraphic messages, a central station and a plurality of substations, a source of periodic signaling-current located at the central station, telegraph-lines leading from said central station to the substations, and supplied with current from said source, main-line transmitting and receiving instruments located at central and at each of the substations, synchronously-operated current-distributers located at central and at the substations whereby the central and sub stations may be placed in communication with each other at rapidly-recurring periods, circuit making and breaking devices operated by said current-distributers for impressing the characters upon the line-current, and local receiving apparatus operated by the main-line receiving instruments through the medium of said current-distributers, substantially as described.

5. In the distribution of telegraphic messages a central station and a plurality of substations, a source of alternating signaling-current located at the central station only, telegraph-lines leading from said central station to said substations and supplied with current from said source, main-line transmitting and receiving instruments located at central and at each of the substations continuously and synchronously rotating current-distributers located at central and at the substations whereby the central and sub stations may be placed in communication with each other at regularly and rapidly recurring periods, substantially as described.

6. In the distribution of telegraphic messages, a central station and a plurality of substations, a source of alternating signaling-current located at the central station, telegraph-lines leading from said central station to the substations, and supplied with current from said source, main-line transmitting and receiving instruments located at central and at each of the substations, synchronously and continuously operated current-distributers located at central and at the substations whereby the central and sub stations may be placed in communication with each other at rapidly-recurring periods, circuit making and breaking devices located in the circuits of said current-distributers for impressing the characters upon the line-current, and local receiving apparatus operated by the main-line receiving instruments through the medium of said current-distributers, substantially as described.

7. In the distribution of telegraphic messages, a central station and a plurality of substations, a source of periodic signaling-current located at the central station, telegraph-lines leading from said central station to said substations and supplied with current from said source, main-line transmitting and receiving instruments located at central and at each of the substations, synchronously-operated current-distributers located at central and at the substations, means regulated by the signaling-current for maintaining the synchronism of said current-distributers at the substations, local transmitting and receiving apparatus located at the central station and at the substation and rendered operative at regularly-recurring periods by the said current-distributers, substantially as described.

8. In the distribution of telegraphic messages, a central station and a plurality of substations, a source of periodic signaling-current located at the central station and at each of the substations, duplex telegraph-lines leading from said central station to said substations and supplied with current from said source, main-line transmitting and receiving instruments located at central and at each of the substations, synchronously-operated current-distributers located at central and at the substations, means regulated by the signaling-current for maintaining the synchronism of said current-distributers, local transmitting and receiving apparatus located at the central station and at the substations and rendered operative at regularly-recurring periods by the said current-distributers, substantially as described.

9. In the distribution of telegraphic messages, a central station and a plurality of substations, a source of periodic signaling-current located at said central station telegraph-lines leading from the central station to said substations and supplied with current from said source, main-line transmitters and main-line receiving-relays located at the central station and at the substations, the line receiving-relay for each line located at central, being balanced and operated by the current reflected back from the substation to central, and means located at central and at the substations, whereby the central and sub stations may be placed in communication with each other at rapidly-recurring periods, substantially as described.

10. In the distribution of telegraphic messages, a central station and a plurality of substations, a source of signaling-current located at the central station, telegraph-lines leading from said central station to said substations, and supplied with current from the said source, a main-line transmitter and a main-line receiving-relay at central for each of the lines, and a main-line transmitter and a main-line receiving-relay located at each of the substations, synchronously-operated current-distributers located at the central station and at the substations and allotting (for the transmission of signals), a fixed number of impulses of said periodic current to each of said lines in rapid succession, and local transmitting and receiving instruments operating in conjunction with said current-distributers, substantially as described.

11. In the distribution of telegraphic messages, a central station and a plurality of substations, a source of alternating signaling-current located at the central station, telegraph-lines leading from said central station to said substations, and supplied with current from the said source, a main-line transmitter and a main-line receiving-relay at central for each of the lines, and a main-line transmitter and a main-line receiving-relay located at each substation for its respective line, synchronously-operated current-distributers located at the central station and at the substations and allotting a fixed number of impulses of said periodic current to each of said lines for signaling purposes in rapid succession, and local transmitting and receiving instruments operating in conjunction with said current-distributers, substantially as described.

12. In the distribution of telegraphic messages, a central station, at which is located a source of periodic signaling-current, a plurality of telegraph-lines supplied with current from said source, means for impressing the characters or signals upon said lines, and means for receiving the messages upon each line separately, current-distributers adapted to bring the said means for impressing the characters upon the lines and said means for receiving the messages into operation at rapidly-recurring periods, substantially as described.

13. In the distribution of telegraphic messages, a central station and a plurality of substations, a source of periodic signaling-current located at the central station, telegraph-lines leading from the central station to said substations and supplied with current from said source, a main-line transmitter and a main-line receiving-relay located at central and at each of the substations, means located at central for allowing the transmitting instruments at the substations exclusive use of the receiving-relay at the central station successively and at rapidly-recurring periods, substantially as described.

14. In the distribution of telegraphic messages, a central station and a plurality of substations, a source of periodic signaling-current located at the central station, telegraph-lines leading from said central station to said substations and supplied with current from said source, a main-line transmitter and a main-line receiving-relay located at central, the said relay being balanced with respect to all of the lines, a main-line transmitter and receiving-relay at each of the substations, and means located at the central station for allowing the transmitters at the substations exclusive use of the main-line receiving-relay at central successively and at rapidly-recurring periods, substantially as described.

15. In the distribution of telegraphic messages, a plurality of substations, in combination with a central station comprising the following elements, viz., a source of periodic signaling-current, groups of telegraph-lines leading to groups of substations and supplied with current from the said source, main-line transmitters and main-line receiving-relays, one of each for each group of lines, synchronously-operated current-distributers, a series of local transmitting and receiving instruments operating in conjunction with the main-line instruments and rendered operative at rapidly-recurring intervals by said current-distributers, and switching devices for changing the local instruments from one to the other of said main-line instruments.

16. In the distribution of telegraphic messages, a plurality of substations, in combination with a central station comprising the following elements, viz., a source of alternating signaling and synchronizing current, groups of telegraph-lines leading to groups of substations, and supplied with current from the said source, main-line transmitters and main-line receiving-relays, one of each for each group of lines, synchronously-operated current-distributers, a series of local transmitting and receiving instruments operating in conjunction with the main-line instruments and rendered operative at rapidly-recurring intervals by said current-distributers, and switching devices for changing the local instruments from one to the other of said main-line instruments.

17. In the distribution of telegraphic messages, a plurality of substations in combination with a central station, comprising the following elements, viz., a source of periodic signaling-current, groups of telegraph-lines leading to groups of substations, and supplied with current from the said source, main-line receiving-relays at central, one for each group of lines, a local receiving-circuit relayed from the main line synchronously-operated current-distributers located in said local circuit, a series of local receiving instruments operating in conjunction with the main-line instruments and rendered operative at rapidly-recurring intervals by said current-distributers, and switching devices for changing the local instruments from one to the other of said main-line instruments, substantially as described.

18. In the distribution of telegraphic messages an alternating-current dynamo-electric machine, a plurality of telegraphic lines leading from one of the terminals of said dynamo, main-line transmitting instruments located at the dynamo ends of said lines, and at the distant ends thereof for impressing the messages upon the current carried by said lines, receiving instruments located at corresponding points, and means for allowing said instruments the use of their lines at rapidly-recurring periods, substantially as described.

19. In the distribution of telegraphic messages an alternating-current dynamo-electric machine, a plurality of telegraphic lines leading from one of the terminals of said dynamo, main-line transmitting instruments located at the dynamo ends of said lines, and at the distant ends thereof for impressing the messages upon the current carried by said lines, receiving main-line relays located at corresponding points, the relays at the dynamo ends of said lines being balanced and operated by the current reflected back from the distant ends, and means for allowing said instruments and relays the use of their lines at rapidly-recurring periods, substantially as described.

20. In the distribution of telegraphic messages, a central station comprising the following elements, viz., an alternating-current generator, a main local conductor supplied with current from said generator, a plurality of transmitters located in the circuit of said conductor, a series of branch telegraph-lines leading from each transmitter, local-current distributers, and a series of local transmitting instruments for operating the main-line instruments and rendered operative at rapidly-recurring intervals by said current-distributers and switching devices for interchanging said transmitters, substantially as described.

In testimony whereof I affix my signature.

HENRIETTA H. ROWLAND,
*Administratrix of the estate of Henry A. Rowland, deceased.*

In presence of—
J. H. KNOWLES,
ANNIE MCFARLAND.